(12) United States Patent
Dotan et al.

(10) Patent No.: US 9,641,540 B2
(45) Date of Patent: May 2, 2017

(54) USER INTERFACE DRIVEN TRANSLATION, COMPARISON, UNIFICATION, AND DEPLOYMENT OF DEVICE NEUTRAL NETWORK SECURITY POLICIES

(71) Applicant: Cisco Technology, Inc., San Jose, CA (US)

(72) Inventors: Yedidya Dotan, Newton, MA (US); Jason M. Perry, Plymouth, MA (US); Denis Knjazihhin, Lexington, MA (US); Zachary D. Siswick, Framingham, MA (US); Sachin Vasant, Brookline, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/725,489

(22) Filed: May 29, 2015

(65) Prior Publication Data
US 2016/0344743 A1    Nov. 24, 2016

Related U.S. Application Data

(60) Provisional application No. 62/163,515, filed on May 19, 2015.

(51) Int. Cl.
*H04L 29/06* (2006.01)
*G06F 17/30* (2006.01)

(52) U.S. Cl.
CPC ...... *H04L 63/108* (2013.01); *G06F 17/30554* (2013.01); *G06F 17/30867* (2013.01)

(58) Field of Classification Search
None
See application file for complete search history.

(56) References Cited

U.S. PATENT DOCUMENTS

| 5,764,911 A | 6/1998 | Tezuka et al. |
| 6,021,376 A | 2/2000 | Wilson |
| 6,219,053 B1 | 4/2001 | Tachibana et al. |
| 6,678,827 B1 | 1/2004 | Rothermel et al. |

(Continued)

OTHER PUBLICATIONS

Cisco, "User Guide for Cisco Security Manager 4.5", Nov. 20, 2013, Cisco Systems, Inc., OL-30764-01.*

(Continued)

*Primary Examiner* — Peter Poltorak
(74) *Attorney, Agent, or Firm* — Edell, Shapiro & Finnan, LLC

(57) ABSTRACT

A method is performed at a management device to manage multiple network security devices over a network. The security devices are configured to control access to network accessible resources. A query is received. In response to the received query, a respective native security rule that references the specific resource is collected from each security device, where each native security rule is based on a respective native rule model associated with the security device from which the native security rule is collected. Each native security rule is translated into a respective normalized rule that is based on a generic rule model. The respective normalized rules are compared to each other to generate compare results. Based on the compare results, an indication of whether each security device allows or blocks access to the specific resource is generated.

20 Claims, 19 Drawing Sheets

(56) References Cited

U.S. PATENT DOCUMENTS

| | | | |
|---|---|---|---|
| 6,738,908 | B1 | 5/2004 | Bonn et al. |
| 6,826,698 | B1 * | 11/2004 | Minkin ............... H04L 63/0263 709/223 |
| 7,231,661 | B1 | 6/2007 | Villavicencio et al. |
| 7,263,719 | B2 | 8/2007 | Jemes et al. |
| 7,444,395 | B2 | 10/2008 | Sanghvi et al. |
| 7,484,237 | B2 | 1/2009 | Joly et al. |
| 7,653,930 | B2 | 1/2010 | Griffin et al. |
| 7,774,830 | B2 | 8/2010 | Dillaway et al. |
| 7,853,998 | B2 | 12/2010 | Blaisdell et al. |
| 7,912,983 | B1 | 3/2011 | Ward et al. |
| 8,135,657 | B2 | 3/2012 | Kapoor et al. |
| 8,140,664 | B2 | 3/2012 | Huang et al. |
| 8,225,371 | B2 | 7/2012 | Jones et al. |
| 8,234,387 | B2 | 7/2012 | Bradley et al. |
| 8,424,053 | B2 | 4/2013 | Gottimukkala et al. |
| 8,429,255 | B1 | 4/2013 | Khan et al. |
| 8,452,876 | B1 | 5/2013 | Williams et al. |
| 8,490,163 | B1 | 7/2013 | Harsell et al. |
| 8,646,026 | B2 * | 2/2014 | Chang .................. G06F 21/554 726/1 |
| 8,719,919 | B2 | 5/2014 | Rice et al. |
| 8,793,763 | B2 | 7/2014 | Williams et al. |
| 8,844,041 | B1 | 9/2014 | Kienzle et al. |
| 8,856,926 | B2 | 10/2014 | Narayanaswamy et al. |
| 9,027,077 | B1 | 5/2015 | Bharali et al. |
| 2001/0032248 | A1 | 10/2001 | Krafchin |
| 2002/0099823 | A1 | 7/2002 | Jemes et al. |
| 2002/0112043 | A1 | 8/2002 | Kagami et al. |
| 2002/0169957 | A1 | 11/2002 | Hale et al. |
| 2002/0169975 | A1 | 11/2002 | Good |
| 2003/0065942 | A1 | 4/2003 | Lineman et al. |
| 2004/0025016 | A1 | 2/2004 | Focke et al. |
| 2004/0193912 | A1 | 9/2004 | Li et al. |
| 2005/0240990 | A1 | 10/2005 | Trutner et al. |
| 2005/0283823 | A1 | 12/2005 | Okajo et al. |
| 2006/0048224 | A1 | 3/2006 | Duncan et al. |
| 2006/0129933 | A1 | 6/2006 | Land et al. |
| 2006/0161879 | A1 | 7/2006 | Lubrecht et al. |
| 2007/0199044 | A1 | 8/2007 | Hughes |
| 2008/0034401 | A1 | 2/2008 | Wang |
| 2008/0126963 | A1 | 5/2008 | Kim et al. |
| 2008/0141338 | A1 | 6/2008 | Kim et al. |
| 2008/0183603 | A1 | 7/2008 | Kothari et al. |
| 2008/0209505 | A1 | 8/2008 | Ghai et al. |
| 2008/0216148 | A1 | 9/2008 | Bienek et al. |
| 2009/0077621 | A1 | 3/2009 | Lang et al. |
| 2010/0037289 | A1 * | 2/2010 | Roy ...................... G06F 21/604 726/1 |
| 2010/0082513 | A1 | 4/2010 | Liu |
| 2010/0115582 | A1 | 5/2010 | Sapp et al. |
| 2010/0122208 | A1 | 5/2010 | Herr et al. |
| 2012/0163594 | A1 | 6/2012 | Moon et al. |
| 2013/0179937 | A1 | 7/2013 | Mont et al. |
| 2013/0246334 | A1 | 9/2013 | Ahuja |
| 2013/0275574 | A1 | 10/2013 | Hugard, IV et al. |
| 2014/0029039 | A1 | 1/2014 | Deter et al. |
| 2014/0109190 | A1 | 4/2014 | Cam-Winget et al. |
| 2014/0130119 | A1 | 5/2014 | Goldschlag et al. |
| 2014/0165128 | A1 | 6/2014 | Auvenshire et al. |
| 2014/0282823 | A1 | 9/2014 | Rash et al. |

OTHER PUBLICATIONS

Firemon, "Behavior Normalization—Firewall Analysis & Management—FireMon", http://www.firemon.com/technology/normalization/, Retrieved Apr. 8, 2015, 4 pages.

Anonymous: "Creating Firewall Rules (reference)", wiki.ipfire.org, Mar. 29, 2014, pp. 1-5, XP055258932, retrieved from the internet: https://web.archive.org/web/20140329122433/http://wiki.ipfire.org/en/configuration/firewall/rules/start [retrieved on Mar. 16, 2016].

Al-Shear, et al., "Management and Translation of Filtering Security Policies," IEEE International Conference on Communications, ICC '03, vol. 1, May 2003, 5 pages.

Benson et al., "CloudNaaS: A Cloud Networking Platform for Enterprise Applications", SOCC'11, Oct. 27-27, 2011, 13 Pages.

Hamed, et al., "Taxonomy of Conflicts in Network Security Policies," Network and Service Management, IEEE Communications Magazine, Mar. 2006, 8 pages.

Teager, "Oracle Fusion Middleware Developer's Guide for Oracle Entitlements Server," 11g Release 1 (11.1.2), Jul. 2012, 132 pages.

* cited by examiner

1300 POLICY MODEL BRIDGE EXAMPLE

WSA Model Bridge

1305
└─ header
    name:    WSA, version: 1, service definitions: live, mock

1310
└─ policies
    type:    WSA_Access_Policy preferences: readonly rule mapper:

principals:    value = native param; (e.g., principal ←── 172.16.1.10 source)

actions:    value = native param; (e.g., action ←── implied anything)

resources:    value = native param; (e.g., resources ←── 192.168.1.100 dest)

contexts:  value = native param; (e.g., context ←── IP protocol)

results:    value = native param; (e.g., results ←── permit)

1315
└─ entities time_range rule mapper:

resources:value = native param; (e.g., resource ←── defined time range)

URL_category rule mapper:

resources:    value = native param.

```
┌─────────────────────────────────────────────────────┐
│  RECEIVE NATIVE POLICIES FROM CORRESPONDING         │ ─── 1405
│  SECURITY DEVICES, EACH POLICY INCLUDING SECURITY   │
│  RULES BASED ON A NATIVE POLICY MODEL ASSOCIATED    │
│  WITH THE CORRESPONDING DEVICE                      │
└─────────────────────────────────────────────────────┘
                          │
                          ▼
┌─────────────────────────────────────────────────────┐
│  NORMALIZE THE RECEIVED NATIVE POLICIES ACROSS      │ ─── 1410
│  THE DEVICES BASED ON A GENERIC POLICY MODEL        │
│  (E.G., THE PARCR MODEL) TO PRODUCE NORMALIZED      │
│  POLICIES (MAP RULE PARAMETERS OF NATIVE RULES      │
│  EXPRESSED ACCORDING TO THEIR NATIVE POLICY MODEL   │
│  TO CORRESPONDING RULE COMPONENTS OF THE GENERIC    │
│  POLICY MODEL)                                      │
└─────────────────────────────────────────────────────┘
                          │
                          ▼
┌─────────────────────────────────────────────────────┐
│  RECEIVE A GENERIC SECURITY POLICY BASED ON THE     │ ─── 1415
│  GENERIC POLICY MODEL                               │
└─────────────────────────────────────────────────────┘
                          │
                          ▼
┌─────────────────────────────────────────────────────┐
│  TRANSLATE THE GENERIC POLICY TO MULTIPLE           │ ─── 1420
│  NATIVE POLICIES EACH BASED ON A CORRESPONDING ONE  │
│  OF THE NATIVE POLICY MODELS ASSOCIATED WITH A      │
│  CORRESPONDING ONE OF THE DEVICES (MAP GENERIC      │
│  RULE COMPONENTS TO NATIVE RULE PARAMETERS          │
│  EXPRESSED ACCORDING TO CORRESPONDING NATIVE        │
│  POLICY MODELS)                                     │
└─────────────────────────────────────────────────────┘
                          │
                          ▼
┌─────────────────────────────────────────────────────┐
│  PROVIDE THE MULTIPLE NATIVE POLICIES TO THE        │ ─── 1425
│  CORRESPONDING DEVICES                              │
└─────────────────────────────────────────────────────┘
```

How is access to the following resources being controlled?

Facebook

What am I blocking?

| | C1 | C2 | C3 | C4 | C5 | C6 |
|---|---|---|---|---|---|---|
| | Name | Risk | Peer Info | Visits by Month | Object(s) | Action |
| R1 | ☐ facebook.com | ▭ | 89% Permit | 13,532 | CWS | ◯ ● |
| R2 | ☐ Facebook App | ▭ | 91% Permit | 27,378 | CWS, WSA, FirePower | ◯ Nothing ● Monitor ◯ Warn ◯ Auth |
| | Add exception group ▶ | | ◯ CWS (Call Center) | | | ◯ Drop ● Reset |
| | Sales ✕  Marketing ✕  IT ✕ | | ◯ FirePower (HQ) | | | ● Nothing ◯ Monitor ◯ Warn ◯ Auth |
| | | | ◯ WSA (Guest Services) | | | |
| R3 | ☐ Facebook Messenger | ▭ | 23% Permit | 4,251 | CWS, WSA | ◯ ● |

(Search) — Review Configuration  Create Template  Web Security
Network Risk  URL Risk 1707 — Unify
1725
1710
1720
1708
1700

USER INTERFACE DRIVEN TRANSLATION, COMPARISON, UNIFICATION, AND DEPLOYMENT OF DEVICE NEUTRAL NETWORK SECURITY POLICIES

CROSS REFERENCE TO RELATED APPLICATION

This application claims priority to U.S. Provisional Application No. 62/163,515 filed May 19, 2015, the entirety of which is incorporated herein by reference.

TECHNICAL FIELD

The present disclosure relates to security systems for networks, applications, and content.

BACKGROUND

Administering and maintaining security of an enterprise network is critical task to ensure business efficiency and productivity. Security involves numerous tasks, including (without limitation) monitoring for unauthorized operations (intrusions, external accesses, application security, content security, authentication compliance, etc.) which can, among other things, put sensitive data at risk. This can be complicated by the fact that the enterprise network may span numerous geographical regions, nationally an internationally.

In a typical enterprise network, there are numerous security devices of various types as well as numerous management applications. This can make enforcement of requirements challenging. Each device or type of device has its own set of complex policy definitions. A network administrator needs to be an expert on numerous security products in order to define policies and maintain security.

BRIEF DESCRIPTION OF THE DRAWINGS

FIG. 13 is an illustration of a policy model bridge that may be used to map a simplified Web Security Appliance (WSA) access policy to the PARCR model, according to an example embodiment.

FIG. 14 is a flowchart of a method of converting between normalized security policies based on the PARCR model and native security policies based on native security policy models, according to an example embodiment.

FIG. 16 is an illustration of a screen shot of a search UI having a search entry field into which the user may enter a name of a specific resource about which the user is interested, according to an example embodiment.

FIG. 17 is an illustration of a screen shot of a search results UI generated in response to a search directed to a resource selection entered in the UI of FIG. 16, according to an example embodiment.

FIG. 18 is an illustration of a UI that reflects updates made to the UI of FIG. 17 responsive to user selections, according to an example embodiment.

DESCRIPTION OF EXAMPLE EMBODIMENTS

Overview

Figure 1:
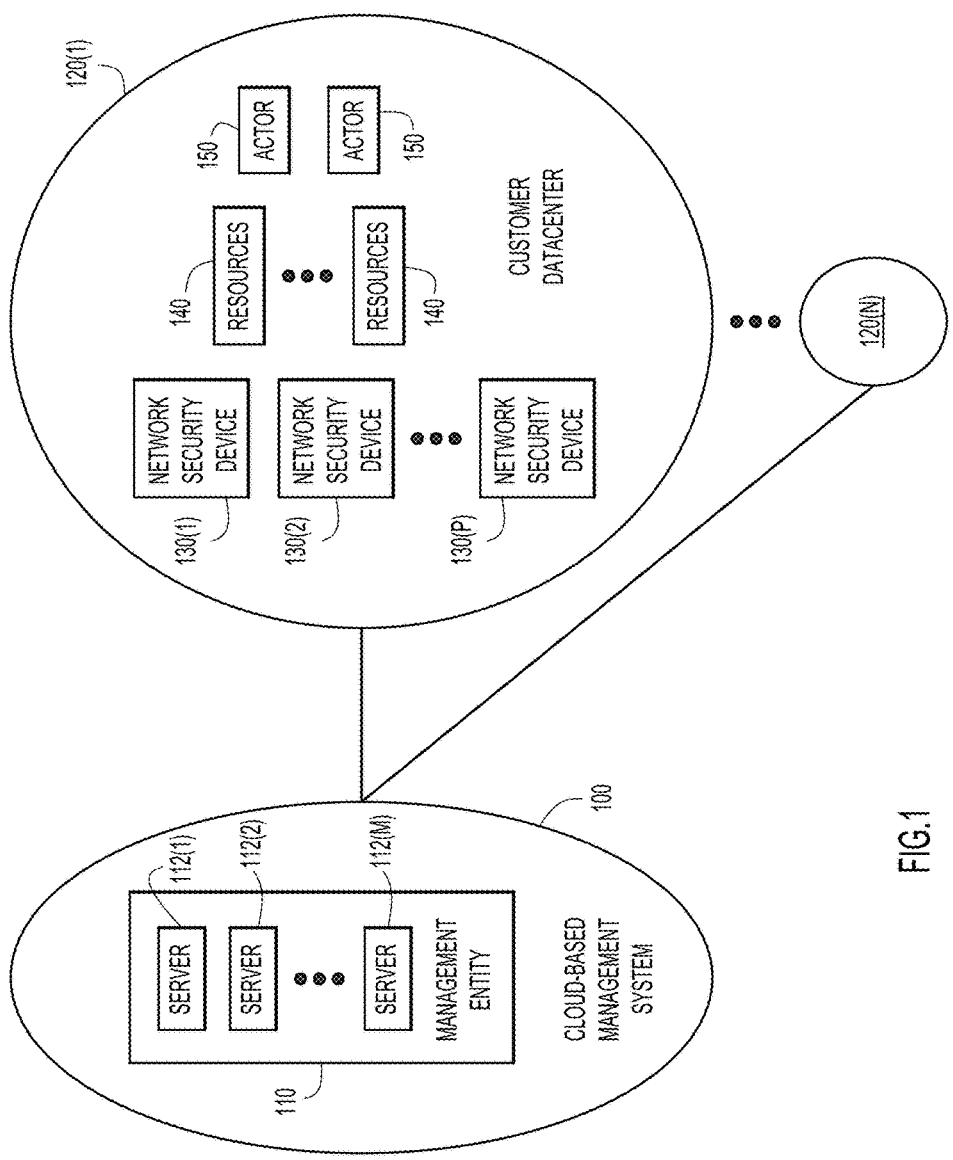
FIG. 1 is a diagram of a system including a cloud-based management entity that manages a plurality of security devices in a customer datacenter, according to an example embodiment.

A method is performed at a management device that manages multiple network security devices over a network. The security devices are configured to control access to network accessible resources. A query is received that asks how the security devices control access to a specific resource. In response to the received query, a respective native security rule that references the specific resource is collected from each security device, where each native security rule is based on a respective native rule model associated with the security device from which the native security rule is collected. Each native security rule is translated into a respective normalized rule that is based on a generic rule model. The respective normalized rules are compared to each other to generate compare results. Based on the compare results, an indication of whether each security device allows access or blocks access to the specific resource is generated for display.

Example Embodiments

Presented herein are a system and methods which simplify, unify and enhance policy management for network security products. A centralized management entity, that may take the form of a cloud-based application, communicates with the network security products (e.g., devices, applications, etc., but generally referred to as "security devices" herein) in a given network environment (e.g., a customer datacenter or customer enterprise network, etc.). The system can perform analytics and obey shared best practices to provide enhanced insight into network security threats in order to make prompt mitigation. The system presented herein can achieve real-time integration between threats and policy enforcement in a way not heretofore possible.

Examples of network security devices/products that may be integrated into the system presented herein include, but are not limited to including, firewalls, intrusion prevention systems (IPSs), Next Generation firewalls (NGFWs), Next Generation IPSs (NGIPSs), web security appliances (WSAs), identity services engines (ISEs), application security appliances (ASAs), cloud web security (CWS) products, security manager products, content security management appliances, cloud firewalls, intrusion detection systems (IDSs), etc.

As used herein, a security policy is a set of (one or more) rules that collectively govern what is and what is not allowed through security devices/products. Security policies include network security policies, application security policies, and authentication security policies. A policy typically includes multiple attributes, such as source, destination, applications, port, universal resource locator (URL), on which to take a network security operation or action (e.g., permit or deny). The embodiments presented below are directed to network security policies for illustrative purposes only, and may be used for application security policies and authentication security polices, as would be appreciated by one of ordinary skill in the relevant arts with access to present description.

Thus, the term "network security device" as used herein is not meant to be limited to network devices, and may include other security devices and applications, such as application security, content security, authentication, etc. Thus, more generally these devices are referred to as "security devices" and are meant to include physical devices as well as applications or tools. Likewise, the term "network security policy" is not limited to network policies, and may include other security policies, such as application security policies, content security policies, authentication policies, etc., and thus, more generally these policies are referred to as "security policies."

A business policy is typically a statement in writing of how a company plans to protect the company's physical and information technology (IT) assets. A role of a security architect or security operator is to apply the business policy into enforceable security policy(ies), monitor the enforcement, and make changes as needed.

OVERALL SYSTEM

Referring now to FIG. 1, a cloud-based management system 100 is shown that connects to and communicates with network security devices in a customer datacenter. FIG. 1 shows the details of customer datacenter 120(1), but it should be understood that the cloud-based management system 100 may connect and communicate with multiple customer datacenters 120(1)-120(N) as shown in FIG. 1.

The cloud-based management system 100 includes a management entity 110 that consists of one or more computer servers 112(1)-112(M) that execute software to perform the operations described throughout this disclosure. An example of a hardware configuration for the management entity 110 is described in more detail below in connection with FIG. 7.

The customer datacenters 120(1)-120(N) each includes a plurality of network security devices or products, shown at reference numerals 130(1)-130(P). Within a customer datacenter there are one or more resources 140 and one or more actors 150. The resources 140 may include servers, databases, and the actors 150 are users or processes using a computing device (personal computer, SmartPhone, etc.) that may seek access to one or more of the resources 140. The resources and actors may also reside outside the customer datacenter itself, e.g., in the Internet. The network security devices 130(1)-130(P) control access of the actors 150 to the resources 140 according to policies, i.e., a set of one or more rules configured on the respective network security devices.

As explained above, the network security devices 130(1)-130(P) may be of different types from the same or different vendors of network security products. The management entity 110 centralizes and unifies the management of network security policies across the plurality of network security devices 130(1)-130(P) to greatly simplify network security management in a customer datacenter.

Figure 2:
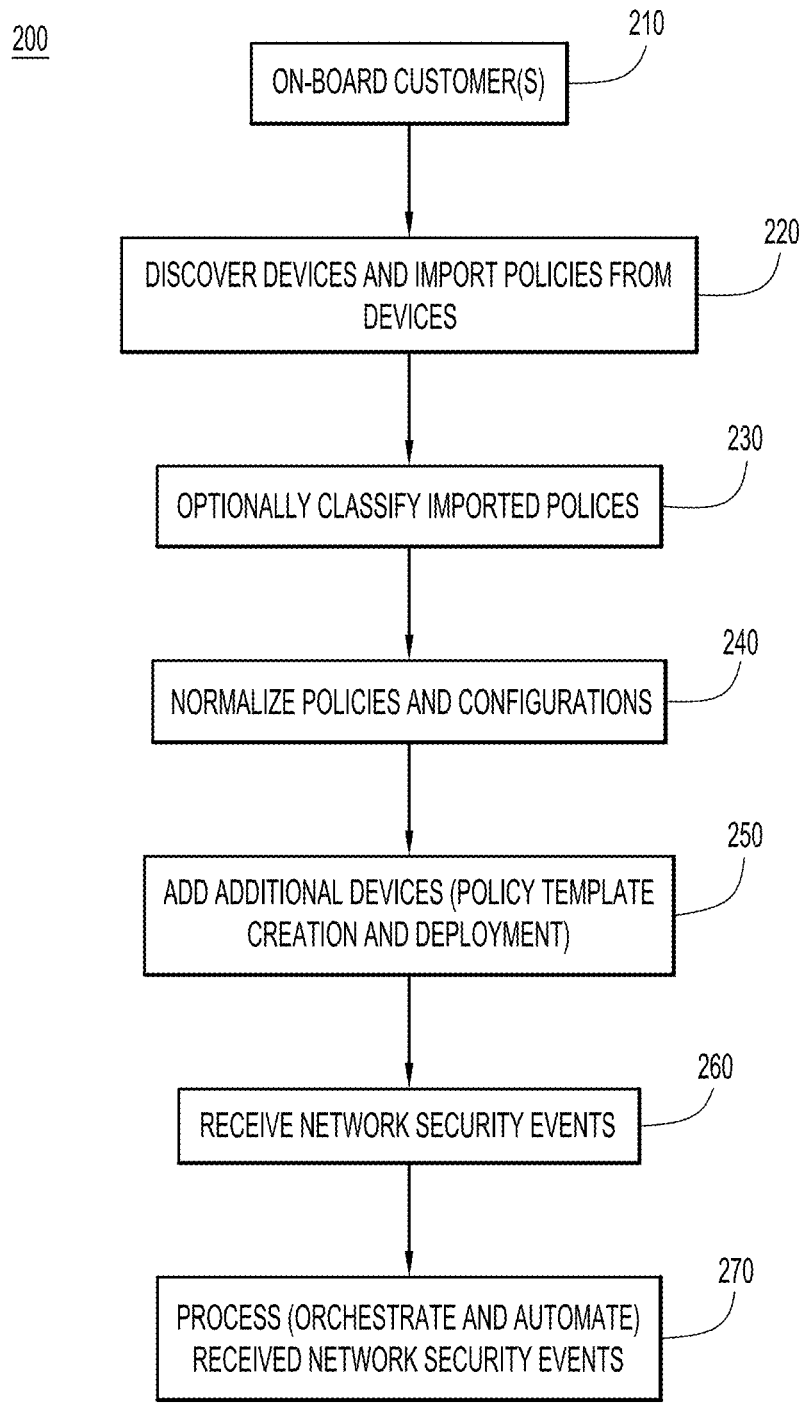
FIG. 2 is a flow chart depicting a method for managing a plurality of security devices in a customer datacenter, according to an example embodiment.
Figure 3:
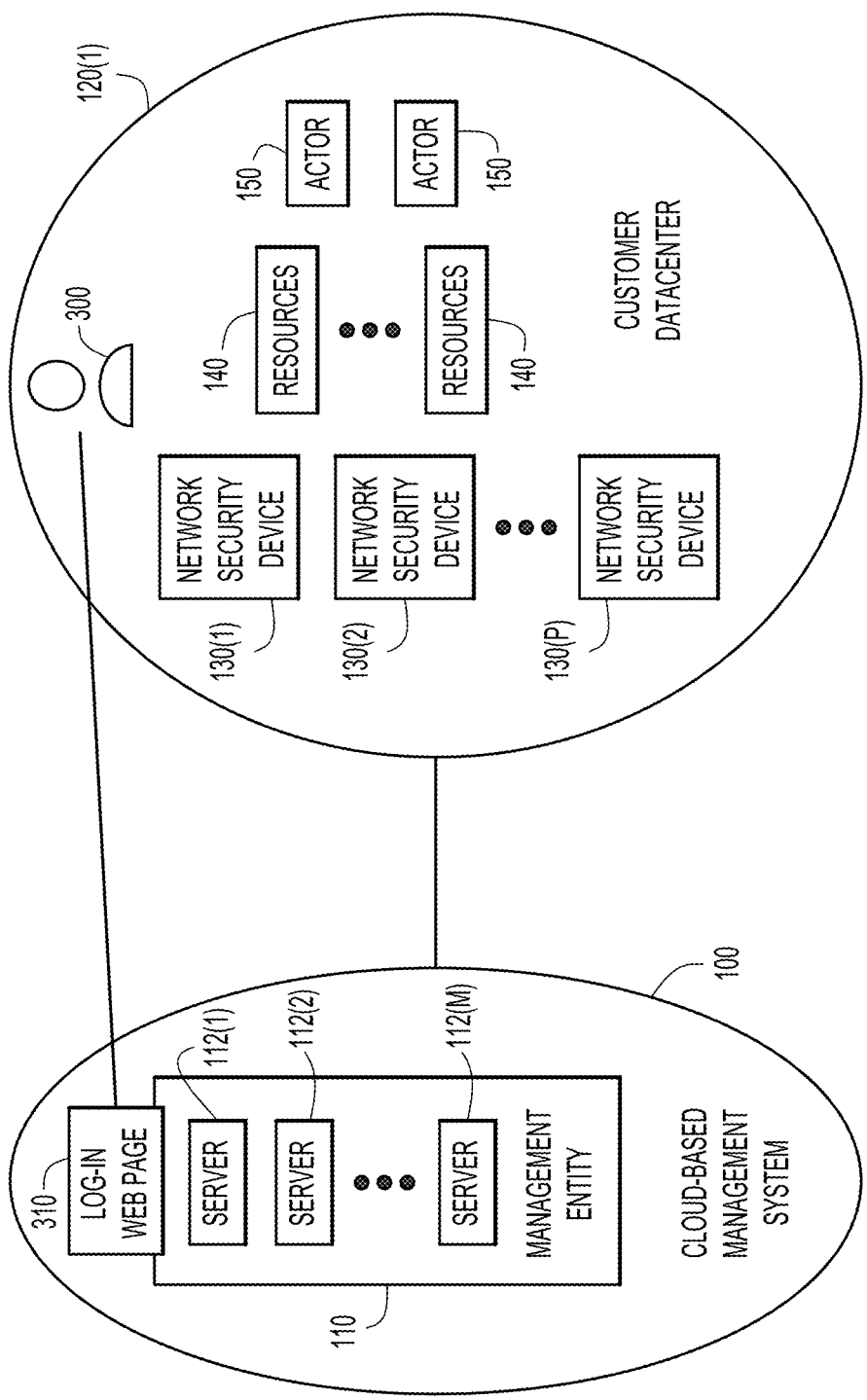
FIGS. 3-6 are diagrams illustrating operations of the various steps in the flow chart of FIG. 2, according to an example embodiment.

Turning now to FIG. 2, a flow chart is shown for a process 200 according to an example embodiment. This process 200 is described in connection with FIGS. 3-8. The process 200 begins at step 210 where a customer (e.g., a business or enterprise) is on-boarded to a cloud-based management system. This on-board operation is shown in FIG. 3. This involves a network administrator shown at reference numeral 300 logging on to a log-on web page 310 served by one of the servers 112(1)-112(M) of the management entity 110. The log-on web page 310 allows the network administrator to set up privileges to permit the management entity to communicate, over the Internet, into the customer datacenter 120(1) in order to connect to the network security devices 130(1)-130(P). In addition, during the initial log-in and setup phase, the network administrator provides names and address (e.g., Internet Protocol (IP) addresses) for each of the network security devices in the customer datacenter. Other types of set-up processes may be used other than use of a log-on web page.

Figure 4:
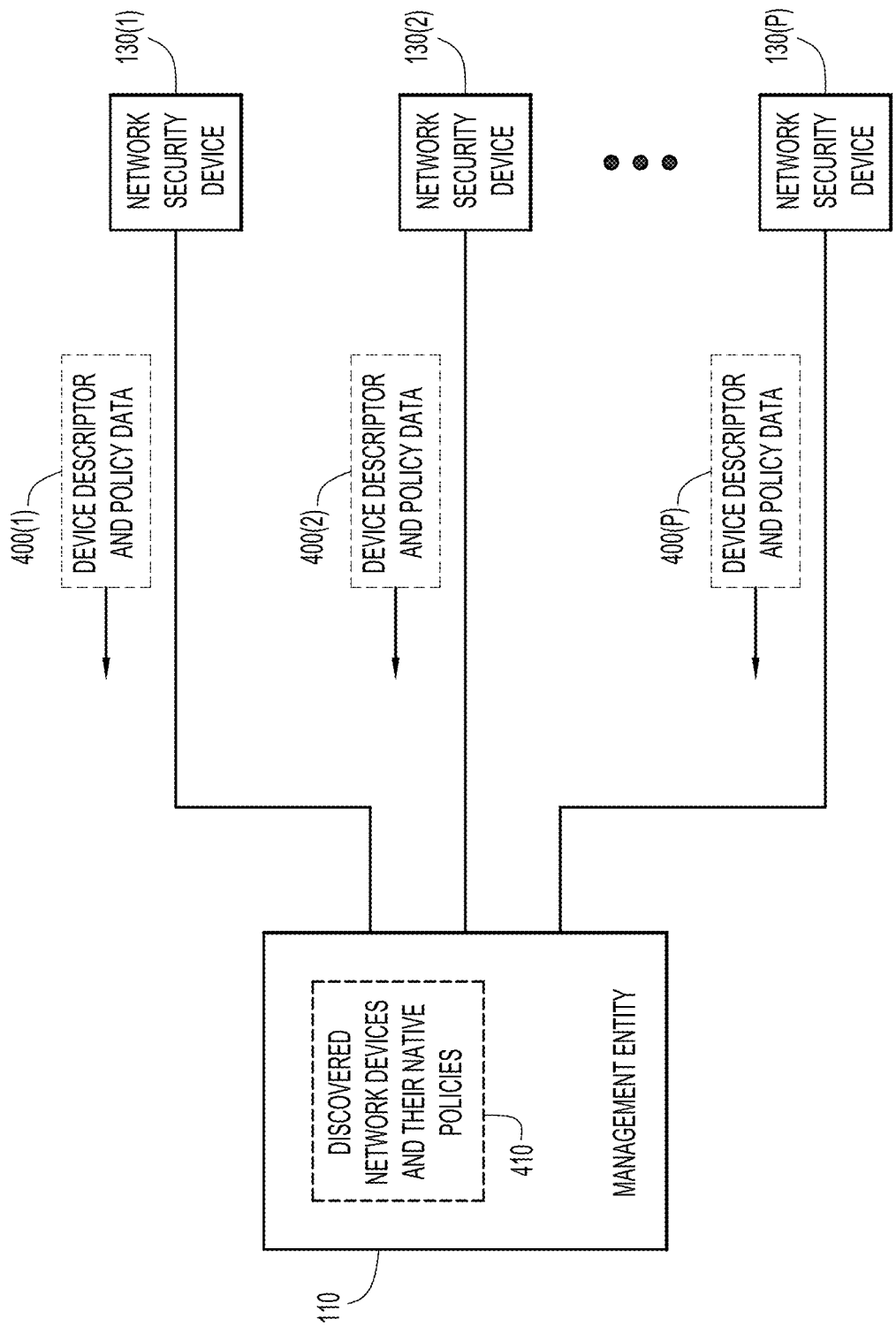
Figure 5:
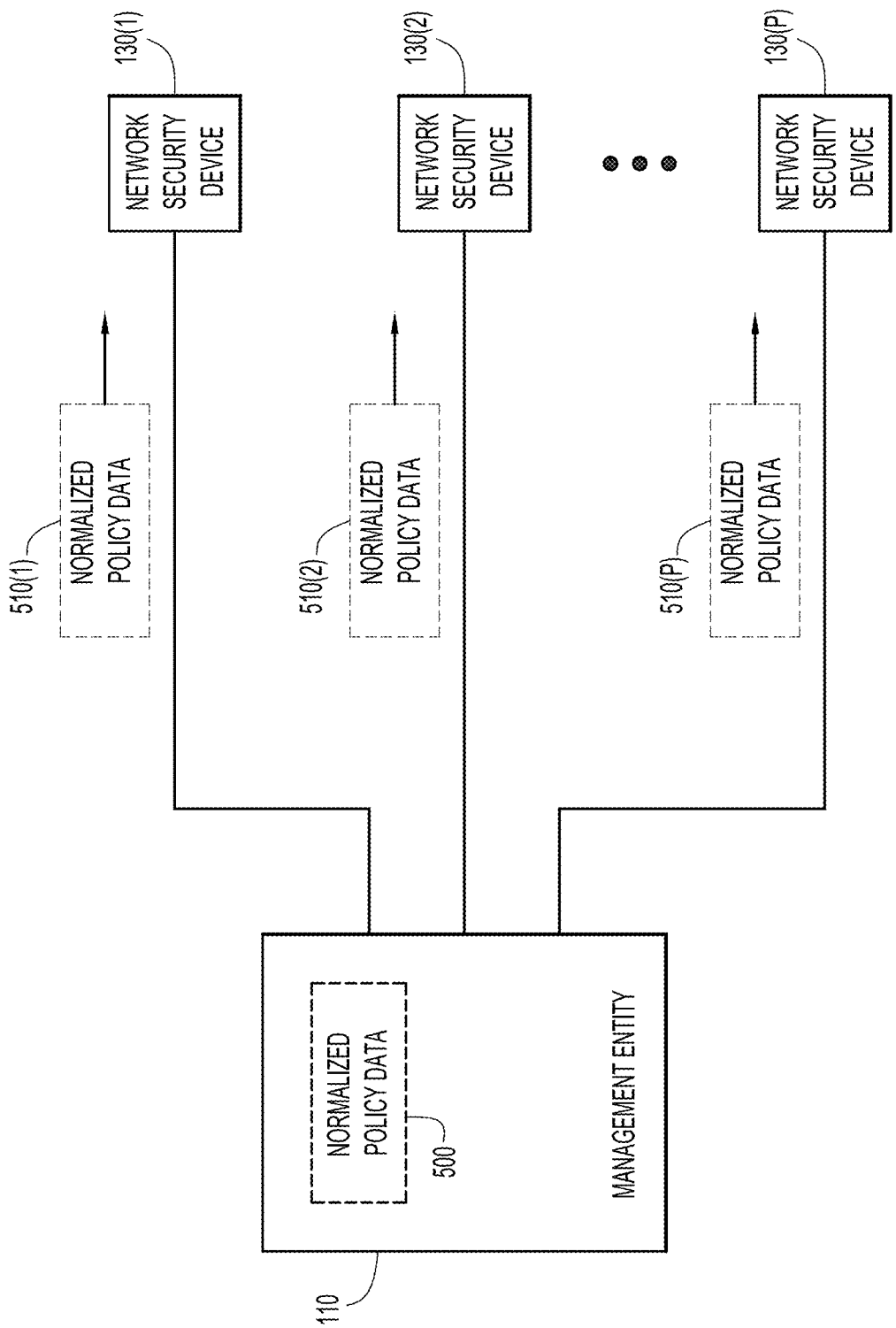

Next, at step 220, the management entity 110 discovers the network security devices and imports the policies from each network security device. This operation is depicted in FIG. 4. The discovery step is described in more detail hereinafter. Briefly, this involves sending a connection string and device type tag to each network security device. Each network security device responds with device descriptor and policy data for each network security rule configured on the respective network security device. This data is shown at reference numerals 400(1)-400(P) from network security devices 130(1)-130(P), respectively. An example of the policy data imported form a security device may be:
  Protocol: HTTPS
  Network: All
  Destination: 132.180.0.0/24
  Description: Web
  Policy: On
  Logging: On The management entity 110 stores the discovered data describing the discovered security devices and their native policies, as shown at reference numeral 410. Each native network security policy may be one or more native network security rules associated with a named network security device and formatted according to a corresponding native policy model for a network security device. Each native network security rule may in turn include a set of rule parameters to permit or deny network access for the named network security device based on a network protocol, source and destination addresses, and a device port.

Next, at step 230, and as an optional step, the imported policies are classified. Specifically, the imported policies are compared against each other to determine whether they can be grouped into one of several categories. These categories include, but are not limited to including: (1) identical, (2) similar, (3) unique and (4) further investigation required. The classification step 230 is described in further detail below in under the heading "Security Policy Classification." Generally speaking, classifying may involve classifying imported native network security policies into network security policy classifications each including one or more of the imported native network security policies based on commonality between security rules included in the native network security policies across the multiple network security devices. Thus, classifying may involve automatically classifying the network security policies into the classifications based on commonality between the network security rules across the named devices associated with the network security policies.

Next, at step 240, data describing the native network security policies received from each of the network security devices is normalized in accordance with a generic policy model to produce normalized policy data. The normalized policy data is shown at reference numeral 500 in FIG. 5. Corresponding normalized policy data 510(1)-510(P) is sent to each of the network security devices, and as explained further hereinafter in the section under the heading "Security Policy Unification", a translation is made from the normalized policy data 500 in accordance with the generic policy model to rules in accordance with the native rule set for the respective network security devices. Generally, each native network security policy imported from a network security device may be a set of one or more native network security rules, each native network security rule including native rule parameters expressed according to the corresponding native model. The imported native network security policies are normalized by, for each imported native network security policy, mapping the native rule parameters expressed according to the corresponding native model to corresponding components of a generic rule defined according to the generic policy model. The mapping may include mapping the native rule parameters to the corresponding components {a principal or actor}, {action}, {a resource}, {a context}, and {perform a result} as used in the generic rule: "if {a principal or actor} tries to perform an {action} on {a resource} within {a context} then {perform a result}."

Figure 6:
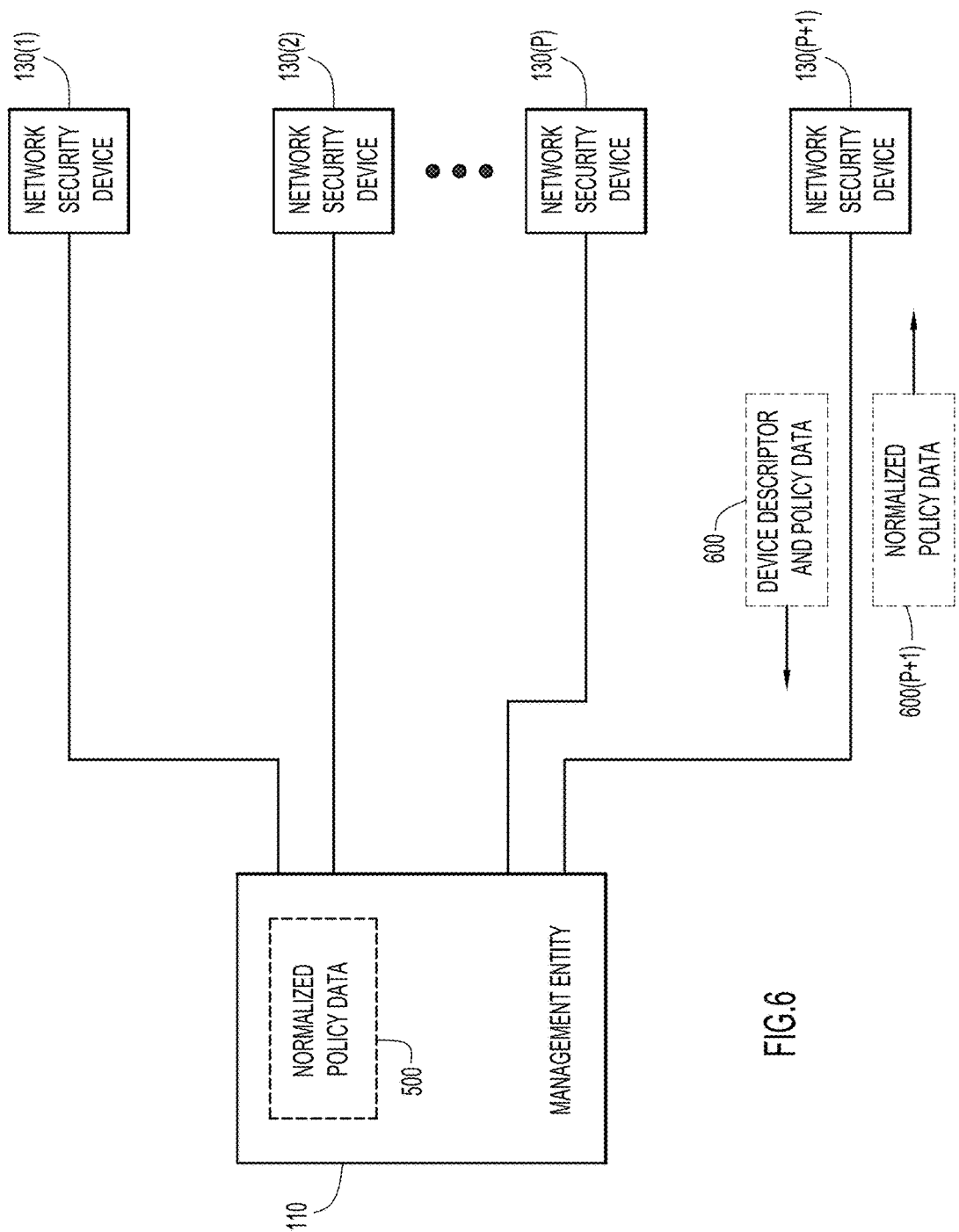

Next, at step 250, additional network security devices may be added and in so doing a network policy template may be created that is deployed to any additional network devices. FIG. 6 illustrates the additional network security device at reference numeral 130(P+1). When a new network security device is added, its device descriptor and native security policy data is imported as shown at reference numeral 600. This policy data is normalized against the generic policy model, as described above in connection with FIG. 5, and normalized policy data 610(P+1) is sent to the network security device 130(P+1).

Next, at step 260, the management entity 110 receives network security events from the network security devices 130(1)-130(P) in the customer datacenter.

Next, at step 270, the management entity processes (orchestrates and automates) the received network security events.

To summarize, at a system level, a method is provided comprising: at a management entity, discovering multiple security devices connected to a network, each security network device to control network access by devices associated therewith according to a corresponding native security policy that is based on a corresponding native policy model associated with the security device; importing the native security policies from the corresponding security devices over the network; normalizing the imported native security policies across the security devices based on a generic policy model, to produce normalized security policies that are based on the generic policy model and representative of the native security polices; and processing (orchestrating and automating) received network security events among the security devices based on the normalized security policies. Processing may involve reporting the received network security events to a desired destination (e.g., a network administrator), and making changes to security policies as needed based on the received network security events.

Figure 7:
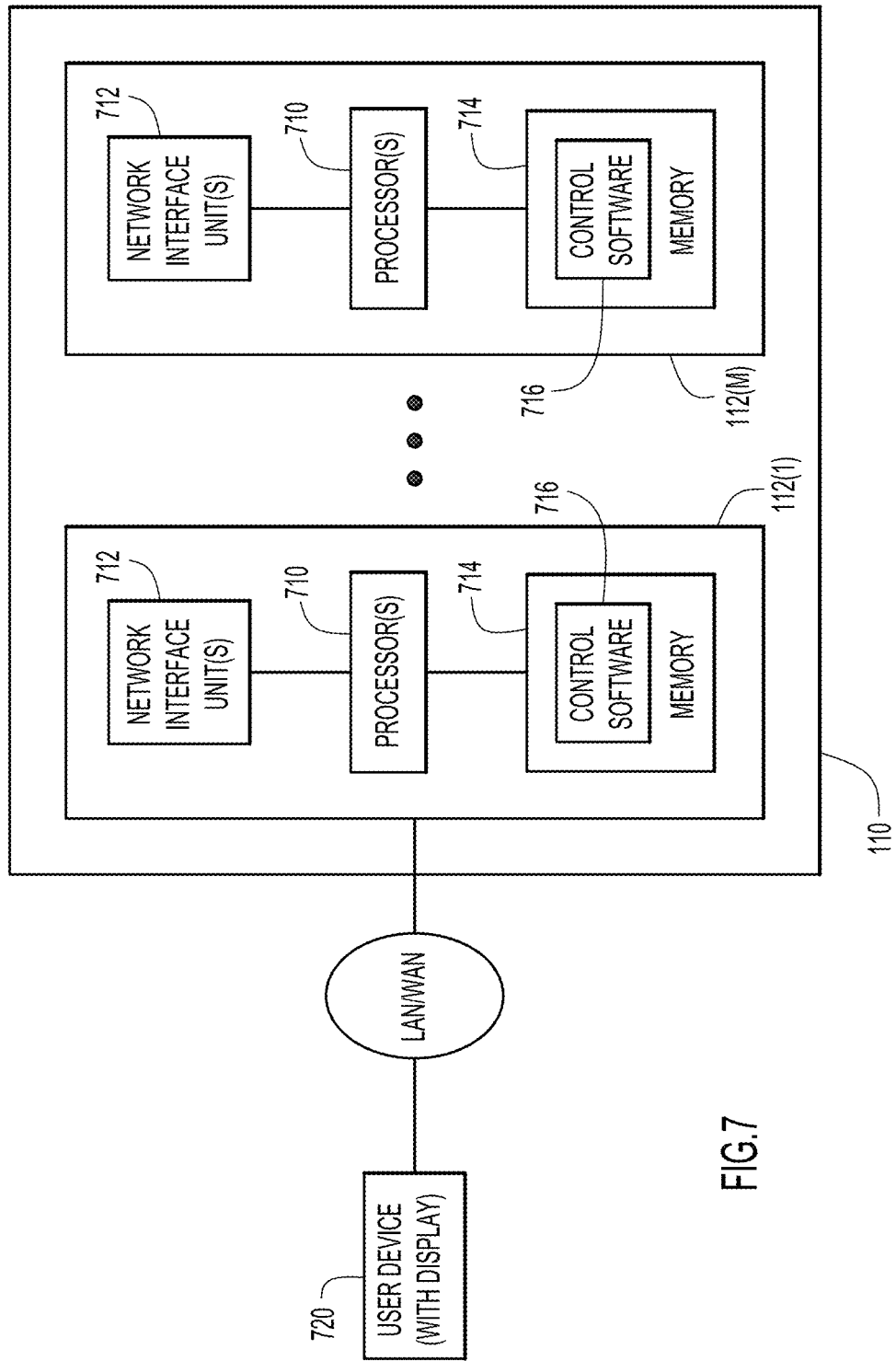
FIG. 7 is a block diagram illustrating a hardware configuration for the cloud-based management entity, according to an example embodiment.

Turning now to FIG. 7, a block diagram is shown of an example hardware implementation for the management entity 110. In one example, the management entity 110 includes one or more servers 112(1)-112(M). Each server includes one or more processors 710, one or more network interface units 712 and memory 714. The memory 714 stores control software 716, that when executed by the processor(s) 710, cause the server to perform the various operations described herein for the management entity 110. Local user input/output devices (not shown) may be coupled with management entity 110 to enable a user to enter information and receive information from the management entity. Such devices include, but are not limited to, a display, a keyboard, a mouse, and so on.

The processor(s) 710 may be a microprocessor or microcontroller (or multiple instances of such components). The network interface unit(s) 712 may include one or more network interface cards that enable network connectivity.

The memory 714 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 714 may comprise one or more tangible (non-transitory) computer readable storage media (e.g., memory device(s)) encoded with software or firmware that comprises computer executable instructions. For example, control software 716 includes logic to implement (i) network security classification, (ii) network policy unification, (iii) network policy template creation and deployment, and (iv) and User Interface (UI) (such as Graphical User Interface (GUI)), driven translation, comparison, unification, and deployment of device neutral network security policies, as described below. Memory 714 also stores data (not shown) generated and used by the aforementioned logic.

Such logic also includes logic to implement User Interfaces (UIs) (such as Graphical User Interfaces (GUIs)) as necessary in connection with the classification, unification, template creation and deployment, and UI driven translation, comparison, unification, and deployment of device neutral network security policies.

A user, such as a network administrator, may interact with the management entity 110, to receive reports, change policy, etc., through UIs by way of a user device 720 that connects by way of a network (local area network (LAN) and/or wide area network (WAN)) with the management entity 110. The user device 720 may be a personal computer (laptop, desktop), tablet computer, SmartPhone, etc.

SECURITY POLICY UNIFICATION

Embodiments directed to normalizing imported rules are now described in the context of security policies for illustrative purposes. As used herein, the terms "normalize" and "unify" and their corresponding derivatives (e.g., normalization and unification) are synonymous and may be used interchangeably.

Figure 8:
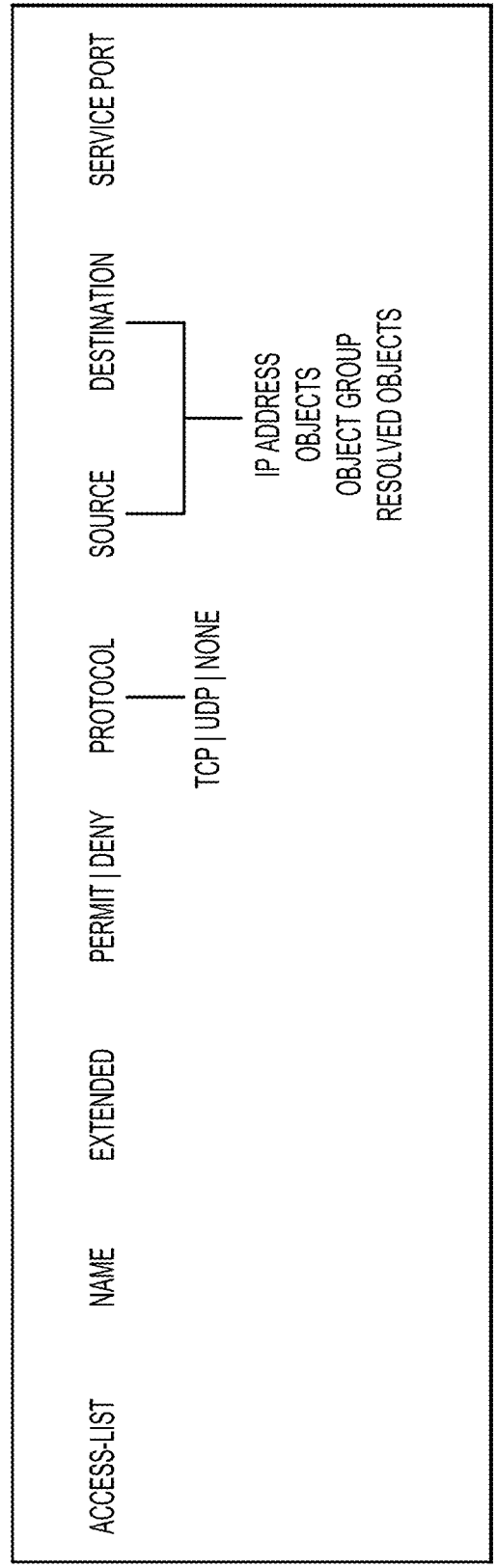
FIG. 8 is a block diagram illustrating a hardware configuration for the cloud-based management entity, according to an example embodiment.

Referring again to FIG. 1 (and FIGS. 3-6), management entity 110 imports different security policies from different types of security devices over a network, as described above. Each imported security policy is considered to be "native" to the security device from which the policy is imported in that the policy is based on a native policy model associated with that security device. Each of the security devices controls network access by devices associated therewith according to the corresponding native network security policy. A native security policy includes native security rules. A native security rule includes or defines a set of rule parameters. With reference to FIG. 8, there is an illustration of a native security rule 800 in the form of an access list—extended rule that may form part of a native security policy. Rule 800 has a name, and includes parameters that permit or deny network access based on a network protocol (TCP, UDP, or none), source and destination addresses, and a service/device port.

Management entity 110 normalizes the imported native security policies across security devices based on a generic policy model, to produce a normalized network security policy generally representative of all of the native network security polices. Management entity 110 may also modify the normalized security policy to suit further generalized security goals, translate the modified normalized security policy to corresponding native security policies representative of the modified normalized policy, and then push the resulting native policies to corresponding ones of security devices. In addition, a normalized policy may be created by a user, automatically translated to suitable native policies, and pushed to multiple security devices (e.g., devices 130). A normalized network security policy is also referred to herein as a 'generic" or "unified" policy network security policy.

As mentioned above, management entity 110 normalizes native security policies that are based on corresponding native policy models to a generic security policy that is based on a generic policy model. In one embodiment, the generic policy model, referred to as the Principal-Action-Resource-Context-Result (PARCR) model, is defined as follows:

If {principal} tries to perform an {action} on {resource} within {context} then {result}.

Figure 9:
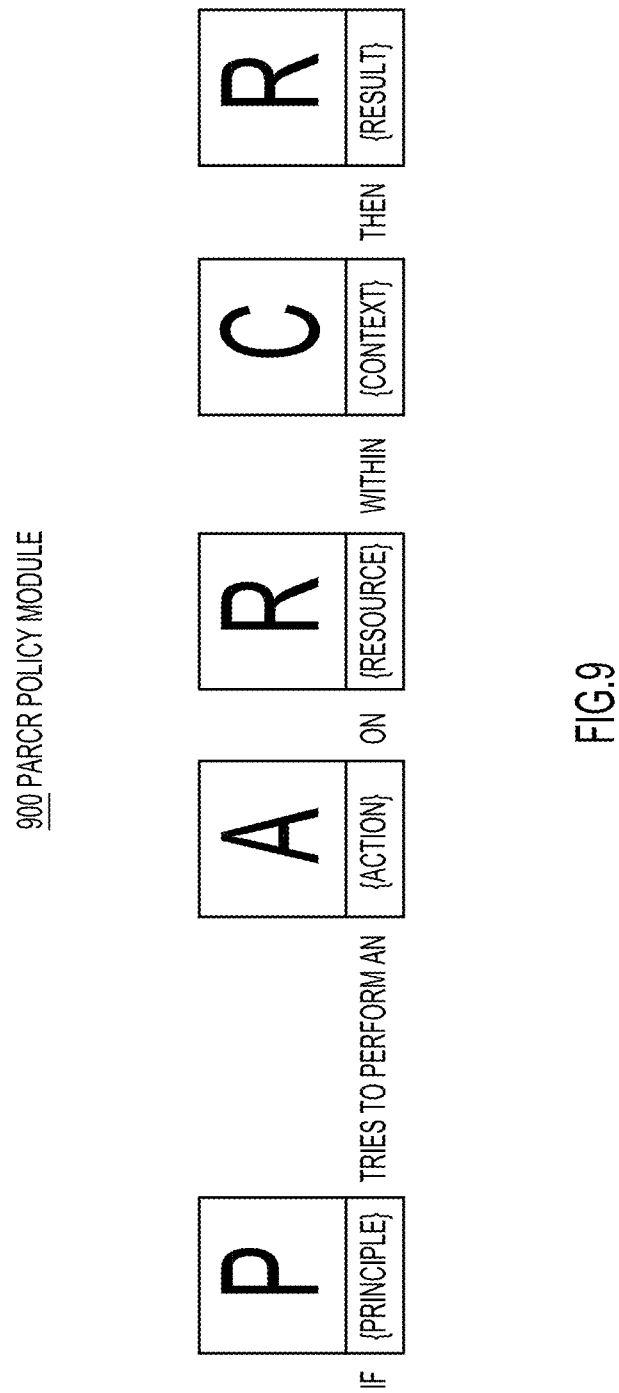
FIG. 9 illustrates a depiction of a security policy and rule model that follows an "if {Principal} tries to perform an {Action} on {Resource} within {Context} then {Result}" format, referred to herein as a "PARCR" model, according to an example embodiment.

With reference to FIG. 9, there is an illustration of a PARCR model 900 (also referred to as a "PARCR policy model"). The PARCR model 900 includes basic PARCR model components, i.e., principal (P), action (A), resource (R), context (C), and result (R), expressed in the "if-then-result" syntax. A normalized or generic network security policy based on the PARCR model 900 includes generic security rules based on the PARCR model. The generic security rules include the PARCR model components (referred to as PARCR "rule components") expressed in the if-then-result syntax. Thus, normalizing a native security policy includes mapping native features such as native security rules (and their respective rule parameters) expressed according to the native policy model to corresponding PARCR rule components expressed in the PARCR model syntax (i.e., the if-then-result form).

The examples below show mappings between native security policies and normalized or generic network security policies based on the PARCR model 900, at the rule level. In other words, in the examples, the native rule parameters of native security rules are mapped to corresponding PARCR rule components.

Example 1 a. Simple ASA rule (in access list—extended form):
Access-list left-to-right extended permit ip host 172.16.1.10 host 192.168.1.100; and
b. PARCR rule components and rule:
principal=172.16.1.10 (source)
resource=192.168.1.100 (destination)
context=ip (protocol)
result=permit
action=implied anything
if 172.16.1.10 tries to perform anything on 192.168.1.100 within ip then permit.

Example 2 a. More complex ASA rule:
Access-list someName extended permit tcp 172.19.103.0 255.255.255.0 object-group ApplicationServers object-group DM_INLINE_TCP_443; and
b. PARCR rule components and rule:
principal=address range 172.19.103.x
resource=ApplicationServers (group of resources)
context=tcp+port group DM_INLINE_TCP_443
result=permit
action=implied anything
if 172.19.103.x tries to perform anything on Application-Servers within tcp and DM_INLINE_TCP_443 then permit.

Example 3 a. Simple WSA rule:
Block all users from using facebook messaging; and
b. PARCR rule component and rule:
principal=all users (anyone)
resource=facebook messaging
context=any
result=block
action=any
if anyone tries to perform anything on facebook messaging within any then block.

Example 4 a. More complex WSA rule:
(i) Allow all users to use Linked in but only allow HR to post jobs on Linkedin, (ii) allow all users to use Linkedin; and
b. PARCR rule components and rules:
(i) principal=HR
  resource=LinkedIn Jobs
  context=any
  result=permit
  action=post
  if HR tries to perform POST on LinkedIn-Jobs within any then permit.
(ii) principal=all users (anyone)
  resource=LinkedIn
  context=any
  result=permit
  action=access/read
  if anyone tries to perform read on LinkedIn within any then permit.

Example 5 a. Simple WSA rule:
Block all users from using facebook messaging; and b. PARCR rule components and rule:
principal=all users (anyone)
resource=facebook messaging
context=any
result=block
action=any
if anyone tries to perform anything on facebook messaging within any then block.

Figure 10:
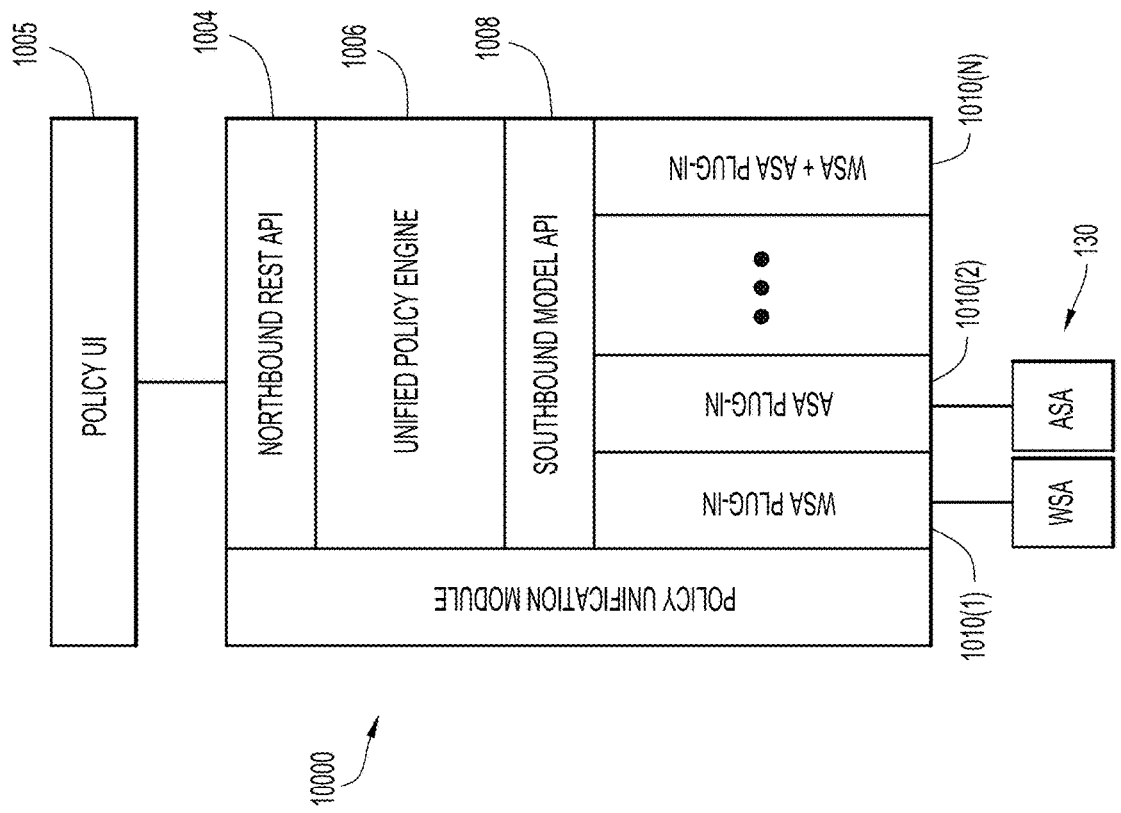
FIG. 10 is a block diagram of a policy unification module that may be implemented in the management entity to convert or map between native security policies expressed according to native policy models and normalized or generic policies expressed according to the PARCR model, according to an example embodiment.

With reference to FIG. 10, there is a block diagram of an example policy unification module 1000 that may be implemented in management entity 110 to convert or map between the native network security policies expressed according to native policy models and normalized or generic policies expressed according to the PARCR model (e.g., PARCR model 900). Module 1000 includes a Northbound Application Programming Interface (API) 1004 (which may be a Representational State Transfer (REST) API) that interfaces with a policy user interface (UI) 1005, a unified policy engine 1006, a Southbound model API 1008, and multiple, network security device specific, network security device plug-ins 1010(1)-1010(N) that interface to corresponding ones of network security devices 130.

Northbound API 1004 allows services or applications such a generalized network security UI or a policy orchestrator (e.g., policy UI 1005) to communicate with unified policy engine 1006. API 1004 allows such services/applications to perform operations such as move policy from one network security device (e.g., one of devices 130) to another or perform operations that traverse the devices and that require policies in more than one network security device type. One example is to block all IP addresses from a geo-location. Another example is to set up access blocking based on the IP being used in the access and a service such as (Secure Shell) SSH over HTTP.

Southbound model API 1008 perform actions on a network security device specific (i.e., native) network security policy. API 1008 receives native network security policies and rules imported via corresponding plug-ins 1010 (from the corresponding network security devices). API 1008 also pushes native network security policies down to network security devices 130 via the corresponding plug-ins 1008. API 1010 may also perform some of the mapping or translating between imported native network security policies and normalized/generic network security policies as mentioned above.

Device plug-ins 1010 read and write network security policy information directly from and to network security devices 130 (e.g. WSAs). Plug-ins 1010 may also include portions of mapping logic to assist with translating native network security policies into the generic/normalized network security policy format. In an example, WSA network access policy rules would define "Block, Monitor, Allow, Warn" as the rule actions. Other WSA network access policy rules, such as WSA time definitions (e.g. "Core Business hours") may be mapped to the "{context}" generic rule component.

Policy engine 1006 may implement a policy object model layer to tie network security device specific policies (i.e., native policies) into the generic policy model, e.g., the PARCR model. This may be implemented as a JavaScript Object Notation (JSON) file that ties generic network security policy and rule components/objects (e.g. principal, context, action) to Java classes that can enumerate the supported components/objects and validate the generic network security rules. The policy object model layer may also allow network security device plug-ins 1010 to attach network security device specific attributes to object definitions.

For example, WSA plug-in 1010(1) may indicate that there is an immutable Boolean on the policy called "Is Global Policy" and a mutable integer called "Policy Order," whose legal values are between n and m. In another embodiment, the policy object model layer may be implemented in Southbound model API 1008.

In an embodiment, aggregated plug-ins may be used in an environment in which policies are to be defined to cross network security devices. For example, a policy definition may require sub-policies in an ASA and a WSA. Such policies may be defined by higher level plug-ins, which, instead of talking to network security devices directly, would talk to network security device plug-ins and build policies on top of the generic policy definitions exposed by the device plug-ins.

Figure 11:
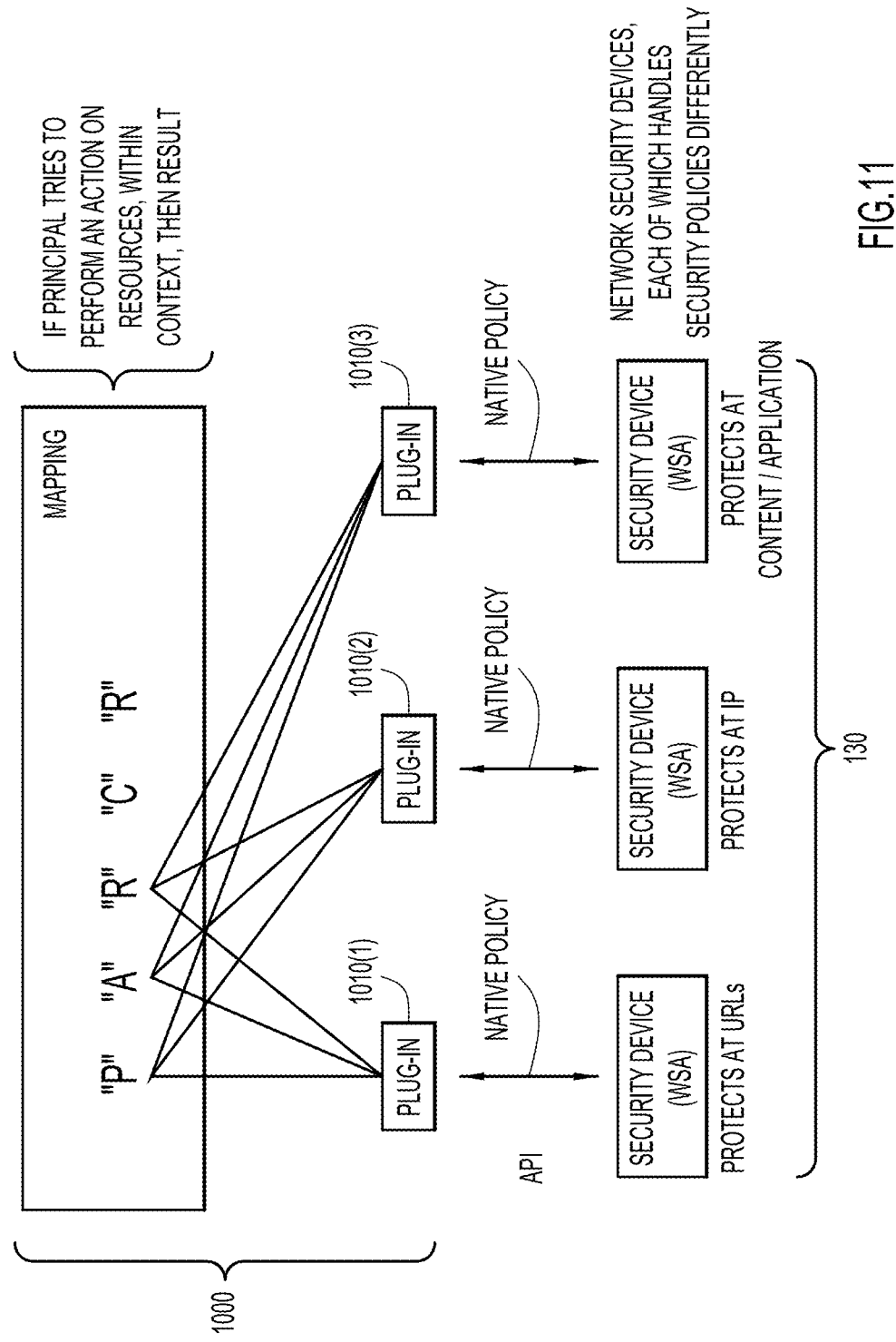
FIG. 11 is an illustration of a PARCR mapping performed in part by security device plug-ins of the policy unification module, according to an example embodiment.

With reference to FIG. 11, there is an illustration of example PARCR mapping 1100 performed in part by plug-ins 1010 of policy unification module 1000. According to mapping 1100, native ASA policies including corresponding native rule parameters which protect based IP protocols, native WSA policies including corresponding native rule parameters which protect based on URLs, and native firewall policies including corresponding native rule parameters which protect based on content/applications are each mapped to corresponding generic rule components of the same generic policy model, i.e., the PARCR model.

Figure 12:
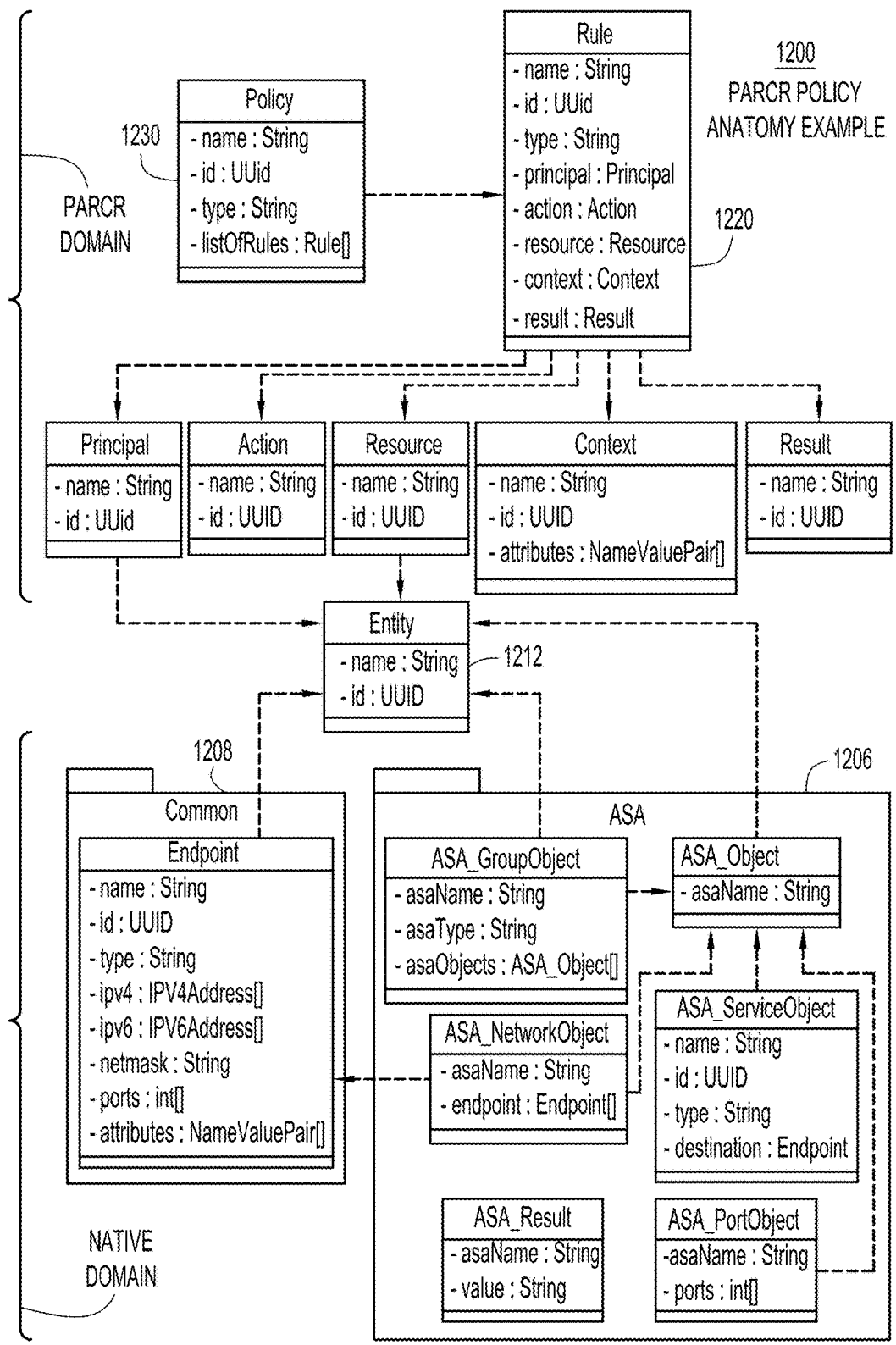
FIG. 12 is an illustration of a PARCR policy model anatomy, according to an example embodiment.

With reference to FIG. 12, there is an illustration of an example PARCR model anatomy or break down 1200 (referred to as "policy anatomy"). The example of FIG. 12 represents one possible data model corresponding to an ASA plug-in. It is understood that partitioning between objects in the anatomy may be varied and that other policy anatomies for other data models are possible. The PARCR policy anatomy is based on the following assumptions:
a. Policies are groups of rules;
b. All rules are if/then statements (see (c));
c. If {principal} attempts to perform {action} on {resource} when {context} then {result};
d. A policy is high level statement;
e. A policy contains a set of rules;
f. A rule is a mid-level statement;
g. An entity is an object to describe a person or thing, and may map to principal or resource rule components of the PARCR model;
h. Entities contain multiple attributes;
i. Attributes are static or dynamic states of an entity;
j. Context contains environmental attributes external to entities;
k. A result is a set of obligations to be performed if the conditions are met; and
l. Obligations can be just about any process including simple allow or deny, logging, or complex code launching.

Going from bottom-to-top in FIG. 12, policy anatomy 1200 depicts a mapping of predefined native policy/rule objects in the native domain (bottom of FIG. 12) to PARCR rule components in the PARCR domain (top of FIG. 12). In the native domain, an ASA construct 1206 (for an ASA device) operates on a variety of objects depicted as boxes inside the box ASA 1206. The ASA (construct) 1206 may be implemented in ASA plug-in 1010(2), for example. Each of the objects depicted in ASA 1206 represents a definition of something that the ASA may control. For example: the ASA_GroupObject may define a range of IP addresses protected by firewall 1206, or a group of other objects; the ASA_Object may define or point to all of the other objects defined in the ASA; the ASA_ServiceObject may be a combination of a IP addresses, a service/device port, and a protocol; the ASA_NetworkObject may be an endpoint; and the ASA_Result includes a permit or deny.

Common object 1208 is also depicted in the native domain. Common object 1208 is common across multiple security device plug-ins 1010, and may include, for example, objects similar to any of the example objects described above in connection with ASA 1206.

As depicted in policy anatomy 1200, various objects in the native domain may represent an entity 1212 accessible to the PARCR model. Entity 1212 maps to either or both the principal and the resource rule components of the PARCR model, as depicted in FIG. 12. Each of the PARCR rule components depicted in FIG. 12 as boxes labeled principal, action, resource, context, and result includes a name represented as a string, and a universally unique identifier (UUID).

Also as depicted in policy anatomy 1200, the PARCR rule components are combined into a generic/PARCR rule 1220 according to the if-then-result syntax. Generic rule 1220 forms part of a generic network security policy 1230.

The following example shows a mapping between a native network security policy expressed in terms of pre-defined objects and a generic network security policy based on the PARCR model:

a. ASA acl-list using above object model:
Access-list executive_access_to_finance extended permit ip object-group Executive_Network object-group Finance_Network
b. PARCR rule components:
principal=ASA_GroupObject named Executive_Network (see definition below)
action=any
resource=ASA_GroupObject named Finance_Network (see below)
context=Context object with namevalue type:ip
result=ASA_Result with value "permit"
ASAGroupObject.name=Executive_Network
ASAGroupObject.asaObjects={ASA_NetworkObject. endpoint, . . . }.

In normalizing native security policies (based on native policy models) to generic security policies (based on a common generic policy model) as described above, it is desirable to "bridge" between the generic (e.g., PARCR) and native (e.g., WSA) models through corresponding data elements associated with the native and generic policies (as opposed to code). Accordingly, a policy data-driven "policy model bridge" that describes or defines native policies in terms of the PARCR model may be used to map the native policies to PARCR rule components. As described above in connection with policy anatomy 1200, objects that are not strictly security policies but are referenced by the policies are modeled as entities. An example policy model bridge is described below in connection with FIG. 13.

With reference to FIG. 13, there is shown an example of a policy model bridge 1300 that may be used to map a simplified WSA access policy to the PARCR model. Other policy model bridges may be used corresponding to other security devices. Policy model bridge 1300 may also map native entity objects directed time ranges over which a native rule is to be active and URLs that may need to be blocked or allowed to corresponding PARCR rule components. In the example of FIG. 13, policy model bridge 1300 operates to perform the WSA to PARCR rule mapping shown above in Example 1. In that example, policy model bridge 1300 may be implemented as a JSON file that represents a contract between the PARCR model and WSA plug-in 1010(1), and may be implemented in the WSA plug-in.

Policy model bridge 1300 (referred to as simply "bridge 1300") includes a "header" 1305 that provides basic information about the corresponding plug-in. Header 1305 indicates a name of bridge 1300 (e.g., "WSA"), which is unique across all plug-ins 1010. Header 1305 also includes a version (e.g., "1") to indicate a schema of the policy bridge JSON file being used. Header 1305 includes a service definition that indicates an actual implementation of the service as well as a mock implementation. Running a mock implementation simplifies, for example, automated testing of generic policy UI 1005. The exposed service retrieves concrete instances of native policies and entities.

After header 1305, bridge 1300 includes "policies" 1310, which enumerates substantially all of the policies supported by the bridge 1300. Different types of network security devices, such as the WSA, will typically expose network security policies of many different types. Some of these network security policies may be complex and may take advantage of many of the features available in the PARCR model, while other policies may be very simplistic. Policies 1310 define the following:

a. "Type"—The type of a policy may be unique within the JSON file. Each plug-in can expose multiple policies, which are differentiated by type.
b. "Preferences"—A set of generic preferences that govern the behavior of the policy. For example, "readonly" would be used to indicate that the policy can only be read and cannot be modified.
c. "Rule mapper"—This object expresses native policy rules in the PARCR model by mapping native objects (e.g., native rule parameters) to the {principal}, {action}, {resource}, {context}, and {result} components of a PARCR rule. Not all of the PARCR components will be applicable to all native rules. It is therefore legal to omit PARCR rule components to indicate that they aren't used by the underlying device.

Bridge 1300 also describes what types of entities 1315 can be referenced inside of network security policies. In other words, the network security policy is a set of rules composed of references to external entities. Sometimes the types of these entities will be defined within a namespace (e.g. plug-in), which means the entity is specific to the native device. For example, if WSAs have the notion of URL categories, but other devices do not, it makes sense to the URL category entity to be scoped to the WSA plug-in. In other cases an entity may be something much more generic and may apply across multiple devices. For example, a principal definition that indicates a user was authenticated by Active Directory may be applicable to WSA and a particular type of firewall and therefore might be defined in a non device-specific plug-in. Thus, a policy model bridge, such as bridge 1300, may include a reference mechanism or section used to refer to types within the current namespace and within other namespaces. An example reference section is provided below:

namespace": "identity",
"type": "ACTIVE_DIRECTORY_AUTHENTICATED"

In entities 1315, bridge 1300 includes a "URL Category" entity that is expressed through a list of resources. Two types of resources are accepted. A user may pick a type and enter a free form string. Then, depending on type, the string would be validated using one of two validators—the first ensures a string is a valid URL and the second that the string is a valid regular expression. As the user enters the string, policy UI 1005 may call the validators and give a visual indication if the string is incorrect. Types that start with a hash ('#') are build-in types.

In entities 1315, bridge 1300 also includes a time range entity, which indicates a time range to be mapped to the resources rule component of PARCR. For example, a WSA policy may express two custom time ranges. The first one is "Extended Business Hours" and is defined as being Monday through Friday 7 am to 6 pm and Saturday 10 am to 4 pm. The second one is "Core Business Hours" and is defined as being Monday through Friday 10 am to 2 pm. Bridge 1300 maps such time ranges into the PARCR rule.

A policy model bridge, such as bridge 1300, may also include an access policy action, which is a simple entity that does not include any components. A "hidden" flag may be used to indicate that this entity is not exposed to an end user as a first class object and that it can only be referenced in the context of policy definitions. Enumerating this entity class would return three instances, for example, "Block", "Monitor", and "Warn."

With reference to FIG. 14, there is shown a flowchart of an example method 1400 of converting between normalized network security policies and native network security policies as described above. Reference can be made to FIG. 1 in connection with the description of FIG. 14.

At 1405, management entity 110 receives from security devices corresponding native security policies each based on a native policy model associated with the corresponding network security device. Each of the security devices controls access to resources by other devices according to the corresponding native security policy. Each native network security policy includes a set of one or more native network security rules, each native network security rule including native rule parameters expressed according to the corresponding native policy model.

At 1410, management entity 110 normalizes the received native network security policies across the network security devices based on a generic policy model (e.g., the PARCR model), to produce normalized network security policies that are based on the generic policy model and representative of the native network security polices. To do this, for each received native network security policy, management entity 110 maps the native rule parameters expressed according to the corresponding native policy model to corresponding generic rule components of the generic policy model to form a generic security rule. For example, management entity 110 maps the native rule parameters to PARCR rule components according to the PARCR model in the form: if {principal} tries to perform an {action} on {resource} within {context} then {result}, to generate the generic rule.

Assuming that a given native rule includes native rule parameters configured to cause an identified security device to perform an access control operation (e.g., permit or deny) for a type of access (e.g., read, write, any) based on a protocol, a source address associated with the access control operation, and a destination address associated with the network access, the mapping may include mapping:

a. the source address to the {principal} rule component;
b. the destination address to the {resource} rule component;
c. the protocol to the {context} rule component;
d. the access control operation to the {result} rule component; and
e. the type of access attempted to the {action} rule component.

At 1415, management entity 110 receives a generic security policy (e.g., PARCR rules) based on the generic policy model (e.g. the PARCR model).

At 1420, management entity 110 translates the generic security policy to multiple native security policies each based on a corresponding one of the native policy models associated with the corresponding one of the network security devices. To do this, management entity 110 maps the generic rule components to native rule parameters expressed according to the corresponding native policy model to form native rules representative of the one or more generic network rules.

At 1425, management entity 110 provides the multiple native security policies to the corresponding security devices to enable the security devices to implement the native security policies.

User Interface Driven Translation, Comparison, Unification, and Deployment of Device Neutral Network Security Policies Embodiments directed to UI/GUI driven translation, comparison, unification, and deployment of device neutral network security policies are now described.

Figure 15A:
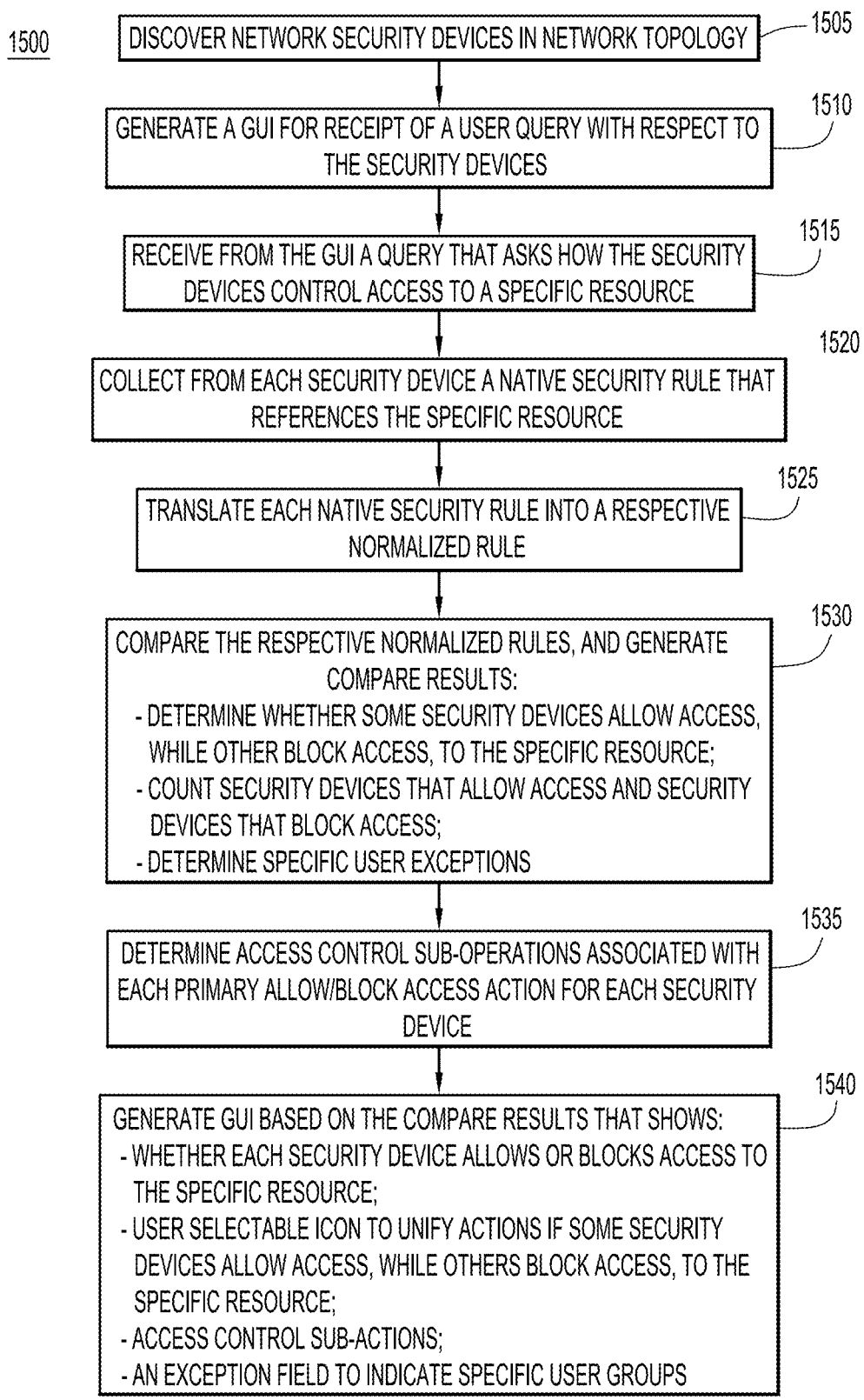
FIGS. 15A and 15B illustrate a flowchart of a method of using User Interfaces (UIs) to drive translating, comparing, unifying, and deploying device neutral network security policies/rules, according to an example embodiment.
Figure 15B:
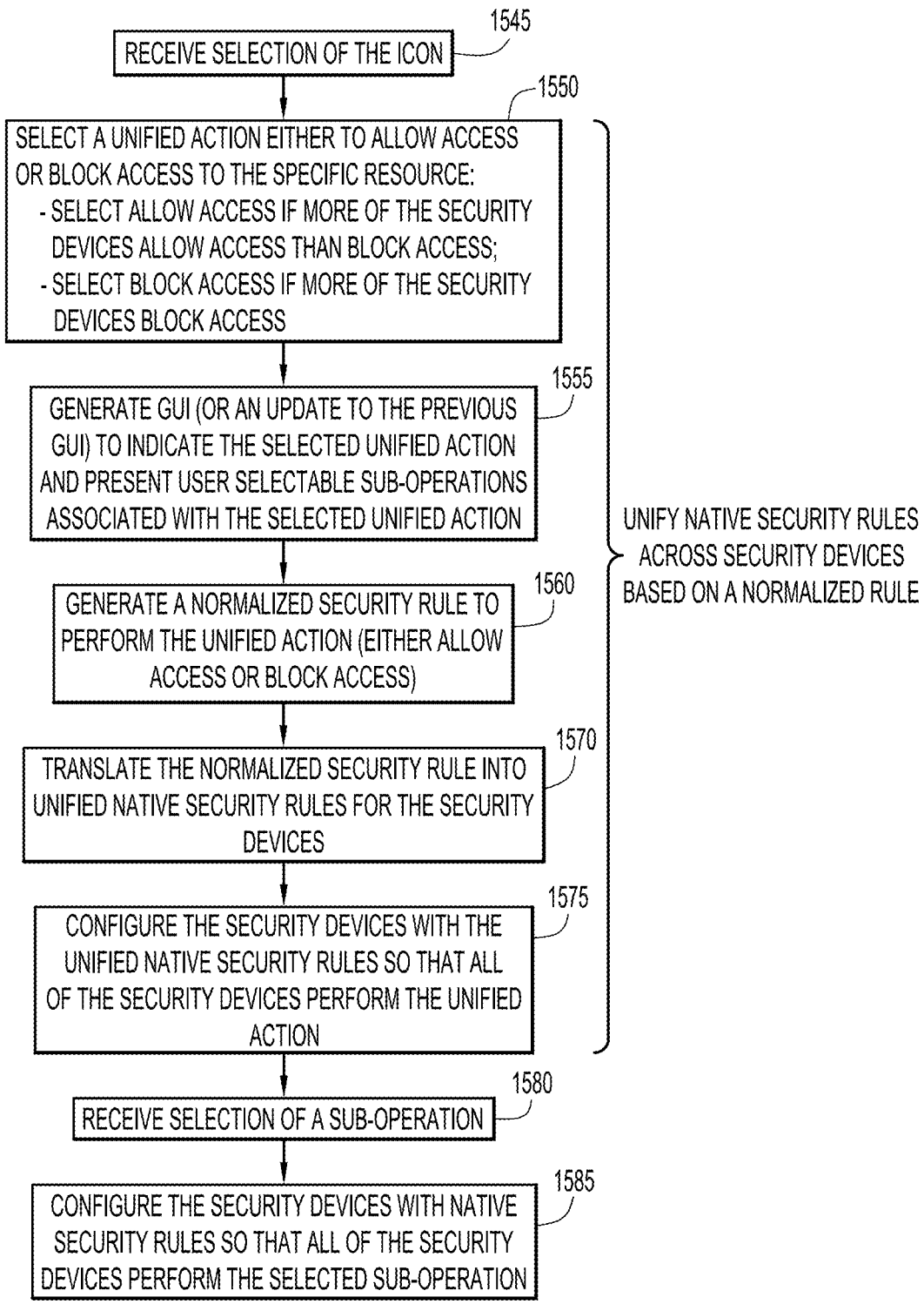
Figure 18:
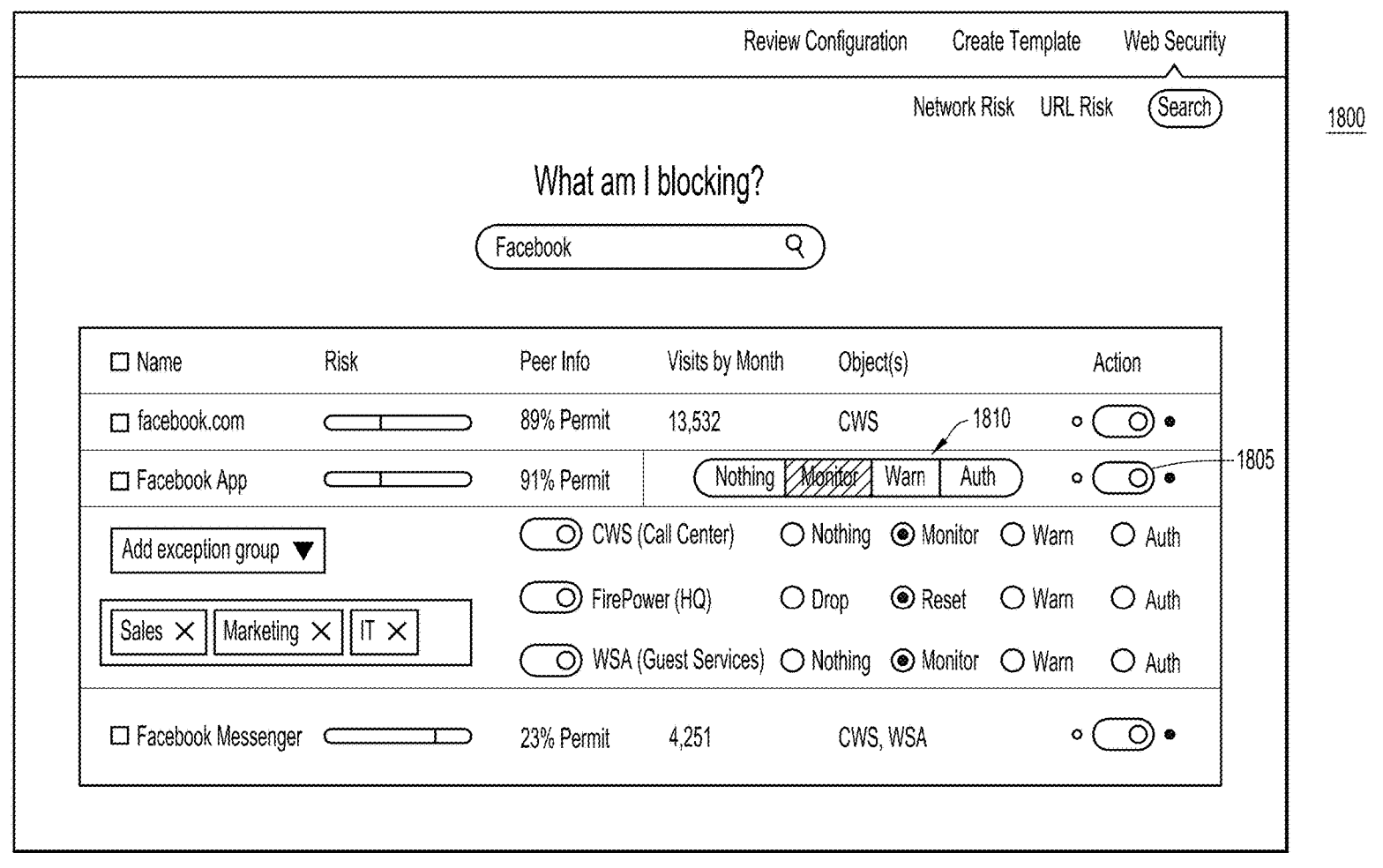

Referring to FIGS. 15A and 15B, there is a flowchart of an example method 1500 of using UIs to drive translating, comparing, unifying, and deploying device neutral network security policies. FIGS. 16-18 are also referred to in connection with the description of FIGS. 15A and 15B. It is to be understood from the following description that after step 1540 in FIG. 15A, processing continues to step 1545 in FIG. 15B.

At 1505, management entity 110 discovers network security devices (e.g., network devices 130) and a network topology in which the security devices are deployed. Management entity 110 may discover the security devices as described above in connection with process 200.

At 1510, management entity 110 generates a search UI through which a user enters a generalized query that asks, for example, how or in what manner the security devices control access to various resources or applications that are accessible through networks to which the security devices are connected. In the ensuing description, the term "resource" generally means any resource or application accessible through a network, including hardware, servers, computer programs, services (such as cloud-based services), and so on. A given resource may be identified by a name and/or a URL, for example. A resource may also refer to a class of resources.

FIG. 16 shows an example search UI 1600 having a search entry field 1605 into which the user may enter, for example, an identity of a specific resource, such as a name or URL, or even a class of resources, about which the user is interested. In the example of FIG. 16, the user has entered "Facebook" into field 1605 in order to discover how access to the resource "Facebook" is being controlled by the security devices.

Referring back to FIG. 15A, at 1515, management entity 110 receives the query entered by the user at 1510.

Responsive to the query, at 1520, management entity 110 collects from each security device 130 a native security rule that references the specific resource, e.g., Facebook. The native security rule is based on a respective native rule model associated with the security device from which the native security rule is collected. That is, the native security rule includes native rule parameters expressed according to the respective native rule model. It is to be understood that each rule may include references to related rules in an access control list, for example. In an embodiment, the collecting at 1520 may include searching native security policies (i.e., sets of native rules) already collected from the security devices at operation 1505 for references to the identity of the specific resource entered at 1515, e.g., searching for reference to related URLs, names, and so on.

At 1525, management entity 110 translates the native security rule from each security device into a respective normalized rule that is based on a generic rule model. Management entity 110 may translate the native security rules in the manner described above in connection with operation 1410 of method 1400. In an example, management entity 110 translates each native security rule (also referred to as a "native rule") into a normalized security rule (also referred to as a "normalized rule") based on the PARCR model. This includes mapping the native rule parameters of each native rule to corresponding normalized rule components in a normalized rule, e.g., to PARCR rule components in a PARCR rule.

In an example of operations 1520 and 1525, operation 1520 collects as native rules at least one CWS rule from a CWS security device, at least one Firepower rule from a Firepower security device, and at least one WSA rule from a WSA security device, and operation 1525 translates the native rules to corresponding normalized rules. The following are example native rules expressed at an abstract level for the CWS, Firepower, and WSA security devices and corresponding normalized rules:

1. CWS Rule=Who: {Anybody EXCEPT Sales}, What: {Facebook App}, Action: {Allow}.
   Normalized rule (Based on CWS)=If {Anyone EXCEPT Sales} accesses Facebook App, then monitor.
2. Firepower Rule=Deny access to Facebook App for all user, except marketing.
   Normalized rule (Based on Firepower)=If {Anyone EXCEPT Marketing} accesses Facebook App, then deny/block.
3. WSA Rule=Monitor access to Facebook App for all users, except IT.
   Normalized rule (Based on WSA)=If {Anyone EXCEPT IT} accesses Facebook App, then monitor.

At 1530, management entity 110 performs a series of compare/determine operations on the normalized rules produced at 1525. Management entity 110 compares the normalized rules against each other to generate compare results. In an example with a normalized rule for each of first, second, and third security devices, the compare includes (i) a compare of the normalized rule for the first security device against the normalized rules for each of the second and third security devices, and (ii) a compare of the normalized rule for the second security device against the normalized rules for the first and third security devices. Management entity 110 also determines whether some of the security devices allow access, while other block access, to the specific resource based on the normalized rules, i.e., whether the normalized rules implement divergent access control with respect to the specific resource. Management entity 110 also counts the number of security devices that allow access, and the number of security devices that block access, to the specific resource based on the normalized rules.

Additionally, at 1530, management entity 110 may examine the normalized rules and/or the native rules from which the normalized rules are derived to identify/determine specific user exceptions to the main/primary access control imposed by the security devices. For example, for each normalized rule that primarily allows or blocks access to the specific resource, management entity 110 determines whether that normalized rule allows or blocks all users except for a specific group of users, which are referred to as "user exceptions." A "group of users" is construed broadly to mean one or more users, i.e., a "group of users" may be only one user or more than one user.

At 1535, management entity 110 further determines any sub-operations that may be associated with access control actions implemented by each security device. Generally, each security device performs a main or primary access control, i.e., allow access or block access, with respect to the specific resource based on the native rules implemented on the security device, and as indicated in the corresponding normalized rule. In addition, each security device may also be able to perform/impose access control sub-operations associated with the primary allow access or block access action. For example, CWS and WSA security devices may include the following combinations of primary access control with associated access control sub-operations: allow access and do nothing (N); allow access and monitor or track access (M); allow access but warn when access occurs (W); allow access but authenticate first (A). In a further example, the Firepower security device may include the following combinations of primary access control with sub-operations, or sub-operation: block access and drop (D); and reset (R). At 1535, management entity 110 determines which of these sub-operations may be applied by each security device.

At 1540, management entity 110 generates for display a search results UI based on the results of operations 1530 and 1535, i.e., the compare and determine operations described above. The search results UI shows whether each security device allows or blocks access to the specific resource. If it is determined at 1530 that some of the security devices allow access, while others block access, to the specific resource, the search results UI presents a user selectable icon to "unify actions." Also, if it is determined at 1530 that specific user exceptions exist, the search results UI presents an exception field to highlight or indicate the exceptions. Also, the search results UI also presents access control sub-operations, if any, determined at 1535.

Turning now to FIG. 17, there is an illustration of an example search results UI 1700 generated by management entity 110 in response to a search directed to the resource "Facebook" entered by the user through UI 1600. The information presented in UI 1700 corresponds to results generated in part based on the example CWS, Firepower, and WSA rules listed above after the description of operation 1525. UI 1700 presents columns, from left-to-right, for a resource name C1 to which access is controlled, a risk C2 associated with the named resource, peer information C3, a number of visits C4 to the named resource per month, an object label C5 that identifies a type of security device, and a main/primary access control action C6 taken by the labeled security device with respect to the named resource. The primary access control action C6 is indicated as an access control toggle switch icon that toggles right and left to indicate "allow access" and "block access," respectively.

UI 1700 presents three rows R1, R2, and R3 to indicate access control of respective resources "facebook.com," "Facebook App," and "Facebook Messenger" that were found during the search performed at operation 1520 for rules that reference the specific resource entered at 1510/1515. Row R1 indicates that a CWS security device (identified in column C5) allows access (as indicated by the toggle right icon in column C6) to the resource facebook.com (identified in column C1). Row R3 indicates that the CWS security device and a WSA security device each allow access to the resource Facebook Messenger.

Row R2 indicates that the CWS security device, a Firepower security device, and the WSA security device (each listed in column C5) all control access to Facebook App (identified in column 1) in divergent ways. That is, row R2 indicates that the security devices control access in divergent ways by presenting a user selectable icon 1707 to "unify" actions (see column 6). In other words, unify actions icon 1707 (also referred to as "unify icon" 1707) indicates that some of the CWS, Firepower, and WSA security devices primarily allow access, while others primarily block access, to Facebook App. Unify icon 1707, when selected by the user, will cause management entity 110 to unify the way in which all of the CWS, Firepower, and WSA security devices control access to the resource Facebook App, as will be described below.

Because the CWS, Firepower, and WSA security devices listed in row R2 diverge on the way they control access to Facebook App, UI 1700 expands row R2 at 1708 to include further information for each of the CWS, Firepower, and WSA security devices. Further information 1708 includes a set of access control toggle switches 1710 to indicate that the divergent CWS, Firepower, and WSA security devices primarily allow access, block access, and allow access to Facebook App, respectively.

Further information 1708 also includes a user exceptions field 1720 to indicate that the CWS security device allows access to all users except sales, the Firepower security device blocks access to all users except marketing, and the WSA security device allows access to all users except IT.

Further information 1708 also includes access control sub-operation fields 1725 that indicate, for each of the security devices, possible access control sub-operations associated with the primary access control operation that is imposed. The control access sub-operations shown for the CWS and WSA include: allow access and do nothing (N); allow access and monitor or track accesses (M); allow access but warn when access occurs (W); allow access but authenticate first (A). The control access sub-operations shown for the Firepower security device include: block access and drop (D); and reset (R). UI 1700 indicates that the control access sub-operations M, D, and N are being imposed by the CWS, Firepower, and WSA security devices, respectively.

Returning again back to FIGS. 15A and 15B, at 1545, assuming the user selects the unify icon presented by the UI generated at 1540, at 1545, management entity 110 receives that selection.

Responsive to receipt of the selection of the unify icon at 1545, management entity 110 performs operations 1550-1575 shown in FIG. 15B to unify native security rules across the security devices in compliance with the unified action so that all of the security devices either allow access or block access to the specific resource, as is now described.

At 1550, management entity 110 automatically selects as a unified action either to allow access or block access to the specific resource. Management entity 110 selects as the unified action either (i) allow access (i.e., sets the primary access control to allow access) if it is determined that more of the security devices allow access than block access, or (ii) block access (i.e., sets the primary access control to block access) if it is determined that more of the security devices block access than allow access. If it is determined that the same number of security devices allow and block access to the specific resource, in one embodiment, management entity 110 selects to allow access as the unified action and, in another embodiment, selects to block access as the unified action.

At 1555, responsive to the automatic selection at 1550, management entity 110 generates a UI, or updates the previous UI generated at 1540, to indicate the unified action (either allow access or block access) selected at 1550, and present user selectable sub-operations, if any, associated with the selected unified action. Presentation of the user selectable sub-operations is optional.

FIG. 18 illustrates an example UI 1800 generated at step 1555. UI 1800 is similar to UI 1700, except that UI 1800 includes (i) toggle switch icon 1805 toggled right to indicate that the selected unified action is "allow access" to Facebook App, and (ii) a user selectable access control sub-operations field 1810. User selectable access control sub-operations field 1810 indicates user selectable access control sub-operations associated with the allow access unified action, including Nothing (N), Monitor (M), Warn (W), and Authenticate (A). In the example of FIG. 18, the user has selected Monitor (M) as the access control sub-operation.

Turning back to FIG. 15B, at 1560, management entity 110 generates a normalized rule (e.g., one normalized rule) to perform the unified action (either allow access or block access) selected at 1550. In the example of FIG. 18, the management entity 110 generates a normalized rule to allow access to Facebook. The normalized rule may be based on the PARCR model.

At 1570, management entity 110 translates the normalized security rule to perform the unified action into unified native security rules each for a respective one of the security devices. The unified native rule for each security device when implemented on the security device will cause the security device to perform the unified action (either allow access or block access) with respect to the specific resource. Management entity 110 may translate the normalized rule into the unified native rule in the manner described above in connection with operation 1420 of method 1400.

At 1575, management entity 110 configures each security device with the respective unified native security rule so that all of the security devices either allow access or block access to the specific resource in accordance with selected unified action. To configure a given security device, management entity 110 may download the respective unified native security rule to, and install the rule on, the security device (i.e., management entity 110 deploys the native security rules on the security devices). In the example, of FIG. 18, management entity 110 configures all of the security devices to allow access to Facebook.

At 1580, if the user selects a sub-operation in the UI (or updated UI) generated at 1555, management entity 110 receives the selection. Such selection is optional.

At 1585, responsive to the selection received at 1580, management entity 110 configures each of the security devices with a respective native security rule so that the security devices perform the selected sub-operation. In the example of FIG. 18, the selected sub-operation is Monitor (M). Therefore, management entity 110 configures each security device already configured to allow access to Facebook to also Monitor/record any such access.

In summary, in one form, a method is provided comprising, at a management device that manages multiple network security devices over a network, the security devices configured to control access to network accessible resources, receiving a query that asks how the security devices control access to a specific resource; and, responsive to the query: collecting from each security device a respective native security rule that references the specific resource, each native security rule based on a respective native rule model associated with the security device from which the native security rule is collected; translating each native security rule into a respective normalized rule that is based on a generic rule model; comparing the respective normalized rules to each other to generate compare results; and generating for display, based on the compare results, an indication that shows whether each security device allows access or blocks access to the specific resource.

In another form, an apparatus is provided comprising: a network interface unit that enables communication with a network; and a processor, coupled to the network interface unit, configured to manage multiple network security devices over the network, the security devices configured to control access to network accessible resources, the processor configured to: receive a query that asks how the security devices control access to a specific resource; and, responsive to the query: collect from each security device a respective native security rule that references the specific resource, each native security rule based on a respective native rule model associated with the security device from which the native security rule is collected; translate each native security rule into a respective normalized rule that is based on a generic rule model; compare the respective normalized rules to each other to generate compare results; and generate for display, based on the compare results, a indication of whether each security device allows access or blocks access to the specific resource.

In yet another form, a non-transitory tangible computer readable storage media encoded with instructions is provided. The instructions, when executed by a processor, cause the processor to: receive a query that asks how network security devices control access to a specific resource; and, responsive to the query: collect from each security device a respective native security rule that references the specific resource, each native security rule based on a respective native rule model associated with the security device from which the native security rule is collected; translate each native security rule into a respective normalized rule that is based on a generic rule model; compare the respective normalized rules to each other to generate compare results; and generate for display, based on the compare results, an indication of whether each security device allows access or blocks access to the specific resource.

In another form, a method is provided comprising, at a management device to manage multiple network security devices, determining, based on security rules implemented on and collected from the security devices, whether some of the security devices allow access, while others block access, to a specific resource; if it is determined that some security devices allow access, while others block access, to the specific resource, generating for display a user selectable icon to unify actions across the security devices; receiving a selection of the icon, and responsive thereto: selecting a unified action either to allow access or block access to the specific resource; and unifying security rules implemented on the security devices across the security devices in compliance with the unified action so that all of the security devices either allow access or block access to the specific resource.

In yet another form, an apparatus is provided comprising: a network interface unit that enables communication over a network; and a processor, coupled to the network interface unit, to manage multiple network security devices over the network, the processor configured to: determine, based on security rules implemented on and collected from the security devices, whether some of the security devices allow access, while others block access, to a specific resource; and if it is determined that some security devices allow access, while others block access, to the specific resource, generate for display a user selectable icon to unify actions across the security devices; receive a selection of the icon, and responsive thereto: select a unified action either to allow access or block access to the specific resource; and unify security rules implemented on the security devices across the security devices in compliance with the unified action so that all of the security devices either allow access or block access to the specific resource.

In an even further form, a non-transitory tangible computer readable storage media encoded with instructions is provided. The instructions, when executed by a processor, cause the processor to: determine, based on security rules implemented on and collected from the security devices, whether some of the security devices allow access, while others block access, to a specific resource; and if it is determined that some security devices allow access, while others block access, to the specific resource, generate for display a user selectable icon to unify actions across the security devices; receive a selection of the icon, and responsive thereto: select a unified action either to allow access or block access to the specific resource; and unify security rules implemented on the security devices across the security devices in compliance with the unified action so that all of the security devices either allow access or block access to the specific resource.

The above description is intended by way of example only. Various modifications and structural changes may be made therein without departing from the scope of the concepts described herein and within the scope and range of equivalents of the claims.

What is claimed is:
1. A method comprising:
at a management device that manages multiple network security devices over a network, the security devices configured to control access to network accessible resources, receiving a query that asks how the security devices control access to a specific resource; and
responsive to the query:
collecting from each security device a respective native security rule that references the specific resource, each native security rule based on a respective native rule model associated with the security device from which the native security rule is collected;
translating each native security rule into a respective normalized rule that is based on a generic rule model;
comparing the respective normalized rules to each other;
if results of the comparing indicate that more of the security devices either allow access than block access to the specific resource or block access than allow access to the specific resource, automatically selecting a unified action for all of the network security devices to either allow access or block access to the specific resource, respectively;
displaying an indication of the unified action;
generating a common normalized rule based on the generic rule model to perform the unified action with respect to the specific resource;
translating the common normalized rule into unified native security rules each for a respective one of the security devices; and configuring each security device with the respective unified native security rule so that all of the security devices implement the unified action.

2. The method of claim 1, further comprising:

determining, for each normalized rule, whether the normalized rule allows or blocks access to the specific resource to all users except for a specific group of users indicated in the respective native security rule that was translated into the normalized rule; and if it is determined that the normalized rule allows or blocks access to the specific resource to all users except for a specific group of users, the generating for display includes generating for display an indication of the specific group of users.

3. The method of claim 1, wherein:

each native security rule includes native rule parameters expressed according to the respective native rule model; and the translating includes, for each native security rule, mapping the native rule parameters expressed according to the respective native rule model to respective normalized rule components of the generic rule model to form the respective normalized rule.

4. The method of claim 3, wherein:

the normalized rule components include {principal}, {action}, {resource}, {context}, and {result} components; and the mapping includes mapping the native rule parameters to the normalized rule components according to the generic rule model in the form: if {principal} tries to perform an {action} on {resource} within {context} then {result}.

5. The method of claim 3, wherein:

the comparing includes comparing respective ones of the normalized rule components of the normalized rules to each other.

6. The method of claim 1, wherein the specific resource is accessible through the Internet.

7. The method of claim 1, further comprising:

if the results of the comparing indicate that some of the security devices allow access, while others block access, to the specific resource, the generating for display includes generating for display a user selectable icon to unify actions across the security devices; and receiving a selection of the icon, and responsive thereto:
 selecting a unified action either to allow access or block access to the specific resource; and
 unifying native security rules across the security devices in compliance with the unified action so that all of the security devices either allow access or block access to the specific resource.

8. The method of claim 7, wherein each unified native security rule is based on the rule model native to the respective security device.

9. An apparatus comprising:

a network interface unit configured to enable communications over a network; and a hardware processor, coupled to the network interface unit, configured to manage multiple network security devices over the network, the security devices configured to control access to network accessible resources, the processor configured to receive a query that ask how the security devices control access to a specific resource; and responsive to the query:
 collect from each security device a respective native security rule that references the specific resource, each native security rule based on a respective native rule model associated with the security device from which the native security rule is collected;
 translate each native security rule into a respective normalized rule that is based on a generic rule model;
 compare the respective normalized rules to each other; and
 if results of the compare operation indicate that more of the security devices either allow access than block access to the specific resource or block access than allow access to the specific resource, automatically select a unified action for all of the network security devices to either allow access or block access to the specific resource, respectively;
 generate for display an indication of the unified action;
 generate a common normalized rule based on the generic rule model to perform the unified action with respect to the specific resource;
 translate the common normalized rule into unified native security rules each for a respective one of the security devices; and
 configure each security device with the respective unified native security rule so that all of the security devices implement the unified action.

10. The apparatus of claim 9, wherein the processor is further configured to:

determine, for each normalized rule, whether the normalized rule allows or blocks access to the specific resource to all users except for a specific group of users indicated in the respective native security rule that was translated into the normalized rule; and if it is determined that the normalized rule allows or blocks access to the specific resource to all users except for a specific group of users, generate for display an indication of the specific group of users.

11. The apparatus of claim 9, wherein each native security rule includes native rule parameters expressed according to the respective native rule model; and the processor is configured to translate, for each native security rule, by mapping the native rule parameters expressed according to the respective native rule model to respective normalized rule components of the generic rule model to form the respective normalized rule.

12. The apparatus of claim 11, wherein the normalized rule components include {principal}, {action}, {resource}, {context}, and {result} components; and the processor is configured to map by mapping the native rule parameters to the normalized rule components according to the generic rule model in the form: if {principal} tries to perform an {action} on {resource} within {context} then {result}.

13. The apparatus of claim 11, wherein the processor is configured to compare respective ones of the normalized rule components of the normalized rules to each other.

14. The apparatus of claim 9, wherein if the results of the compare operation indicate that some of the security devices allow access, while others block access, to the specific resource, the processor is configured to:

generate for display a user selectable icon to unify actions across the security devices;

receive a selection of the user selectable icon, and responsive thereto:
 select a unified action either to allow access or block access to the specific resource; and unify native security rules across the security devices in compliance with the unified action so that all of the security devices either allow access or block access to the specific resource.

15. The apparatus of claim 14, wherein each unified native security rule is based on the rule model native to the respective security device.

16. A method comprising:
at a management device that manages multiple network security devices, determining, based on security rules implemented on and collected from the security devices, whether more of the security devices allow access than block access to a specific resource, or more of the security devices block access than allow access to the specific resource;
if it is determined that more of the security devices either allow access than block access to the specific resource or block access than allow access to the specific resource, automatically selecting a unified action for all of the network security devices to either allow access or block access to the specific resource, respectively;
displaying an indication of the unified action;
generating a common normalized rule based on a generic rule model to perform the unified action with respect to the specific resource;
translating the common normalized rule into unified native security rules each for a respective one of the security devices; and
configuring each security device with the respective unified native security rule so that all of the security devices implement the unified action.

17. The method of claim 16, wherein each unified native security rule is based on a rule model native to the respective security device.

18. The method of claim 17, wherein:
the normalized rule includes normalized rule components expressed according to the generic rule model; and
the translating includes, for each unified native security rule, mapping the normalized rule components to native rule parameters of the unified native security rule expressed according to the native rule model.

19. The method of claim 18, wherein:
the normalized rule includes the normalized rule components of {principal}, {action}, {resource}, {context}, and {result} expressed according to the generic rule model in a form: if {principal} tries to perform an {action} on {resource} within {context} then {result}; and
the mapping includes, for each unified native security rule, mapping the normalized rule components {principal}, {action}, {resource}, {context}, {result} to corresponding native rule parameters of the unified native security rule.

20. The method of claim 16, further comprising:
generating for display user selectable sub-actions associated with a user selectable icon to unify actions; and
receiving a selection of one of the sub-actions, and responsive thereto, configuring the security devices with respective native security rules to implement the selected one of the sub-actions.

* * * * *